(12) United States Patent
Matsumura et al.

(10) Patent No.: US 12,526,658 B2
(45) Date of Patent: Jan. 13, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 18/031,262

(22) PCT Filed: Oct. 13, 2020

(86) PCT No.: PCT/JP2020/038666
§ 371 (c)(1),
(2) Date: Apr. 11, 2023

(87) PCT Pub. No.: WO2022/079811
PCT Pub. Date: Apr. 21, 2022

(65) Prior Publication Data
US 2023/0388820 A1     Nov. 30, 2023

(51) Int. Cl.
*H04L 5/00*     (2006.01)
*H04W 24/04*     (2009.01)
*H04W 76/19*     (2018.01)

(52) U.S. Cl.
CPC .......... *H04W 24/04* (2013.01); *H04L 5/0035* (2013.01); *H04L 5/0051* (2013.01); *H04W 76/19* (2018.02)

(58) Field of Classification Search
CPC .... H04L 5/0035; H04L 5/0051; H04W 16/28; H04W 24/04; H04W 76/19; H04W 72/04; H04W 76/10
See application file for complete search history.

(56) References Cited

U.S. PATENT DOCUMENTS

2022/0046438 A1*   2/2022   Lo ................... H04B 7/0695
2022/0109547 A1*   4/2022   Svedman ............ H04L 5/0053

OTHER PUBLICATIONS

International Search Report issued in PCT/JP2020/038666 on Apr. 27, 2021 (2 pages).
Written Opinion of the International Searching Authority issued in PCT/JP2020/038666 on Apr. 27, 2021 (4 pages).
Samsung; "Enhancements on beam management for multi-TRP"; 3GPP TSG RAN WG1 #102, R1-2006131; e-Meeting; Aug. 17-28, 2020 (4 pages).
Samsung; "On Rel.17 FeMIMO WI"; 3GPP TSG RAN WG1 #101, R1-2003918; e-Meeting; May 25-Jun. 5, 2020 (12 pages).

(Continued)

*Primary Examiner* — Derrick V Rose
(74) *Attorney, Agent, or Firm* — Osha Bergman Watanabe & Burton LLP

(57) ABSTRACT

A terminal according to one aspect of the present disclosure includes a receiving section that receives one or more beam failure detection reference signals (BFD-RSs) corresponding to a plurality of transmission/reception points, and a control section that, when radio link quality of at least part of configured BFD-RSs is less than a threshold value, controls beam failure recovery procedure in units of one transmission/reception point or in units of a transmission/reception point set including a plurality of transmission/reception points.

8 Claims, 23 Drawing Sheets

| | MECHANISM OF EXISTING SYSTEMS | WHEN TRP-SPECIFIC BFD-RS/BFR PROCEDURE IS CONFIGURED FOR SERVING CELL | |
|---|---|---|---|
| | BEAM FAILURE DETECTION IN SERVING CELL | BEAM FAILURE DETECTION IN 1 TRP (CERTAIN COUNTER FOR 1 TRP > MAXIMUM COUNT) | BEAM FAILURE DETECTION IN 2 TRP (CERTAIN COUNTER FOR EACH TRP > MAXIMUM COUNT) |
| PCell/PSCell | RANDOM ACCESS PROCEDURE (RACH) | <CASE 1> ENHANCED 2-STEP PROCEDURE BASED ON BFR MAC CE | <CASE 4> RANDOM ACCESS PROCEDURE (RACH) |
| SCell | 2-STEP PROCEDURE BASED ON BFR MAC CE | <CASE 2> ENHANCED 2-STEP PROCEDURE BASED ON BFR MAC CE | <CASE 3> ENHANCED 2-STEP PROCEDURE BASED ON BFR MAC CE |

(56) References Cited

OTHER PUBLICATIONS

Sony; "Considerations on beam management for multi-TRP"; 3GPP TSG RAN WG1 #102e, R1-2005563; E-meeting; Aug. 17-28, 2020 (6 pages).

Qualcomm Incorporated; "Discussion on BFR in multi-TRP operation"; 3GPP TSG-RAN WG2 Meeting #107, R2-1911378; Prague, Czech; Aug. 26-30, 2019 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG-RAN WG1 #97; R1-1907466 "On Beam Failure Recovery for SCell" Convida Wireless; Reno, USA, May 13-17, 2019 (6 pages).

3GPP TSG-RAN WG2 Meeting #111 Electronic; R2-2008195 "Correction on the BFR cancellation" Nokia, Nokia Shanghai Bell; Elbonia, Aug. 17-28, 2020 (7 pages).

Office Action issued in Japanese Application No. 2022-556732; Dated May 14, 2024 (8 pages).

\* cited by examiner

| | MECHANISM OF EXISTING SYSTEMS | WHEN TRP-SPECIFIC BFD-RS/BFR PROCEDURE IS CONFIGURED FOR SERVING CELL | |
|---|---|---|---|
| | BEAM FAILURE DETECTION IN SERVING CELL | BEAM FAILURE DETECTION IN 1 TRP (CERTAIN COUNTER FOR 1 TRP > MAXIMUM COUNT) | BEAM FAILURE DETECTION IN 2 TRP (CERTAIN COUNTER FOR EACH TRP > MAXIMUM COUNT) |
| PCell/PSCell | RANDOM ACCESS PROCEDURE (RACH) | <CASE 1> ENHANCED 2-STEP PROCEDURE BASED ON BFR MAC CE | <CASE 4> RANDOM ACCESS PROCEDURE (RACH) |
| SCell | 2-STEP PROCEDURE BASED ON BFR MAC CE | <CASE 2> ENHANCED 2-STEP PROCEDURE BASED ON BFR MAC CE | <CASE 3> ENHANCED 2-STEP PROCEDURE BASED ON BFR MAC CE |

FIG. 4

|  | MECHANISM OF EXISTING SYSTEMS | WHEN TRP-SPECIFIC BFD-RS/BFR PROCEDURE IS CONFIGURED FOR SERVING CELL |
|---|---|---|
|  |  | BEAM FAILURE DETECTION IN AT LEAST 1 TRP<br>(CERTAIN COUNTER FOR AT LEAST 1 TRP > MAXIMUM COUNT) |
| PCell/PSCell | BEAM FAILURE DETECTION IN SERVING CELL | |
| | RANDOM ACCESS PROCEDURE (RACH) | <CASE 1><br>ENHANCED 2-STEP PROCEDURE BASED ON BFR MAC CE |
| SCell | 2-STEP PROCEDURE BASED ON BFR MAC CE | <CASE 2><br>ENHANCED 2-STEP PROCEDURE BASED ON BFR MAC CE |

FIG. 5

| C7 | C6 | C5 | C4 | C3 | C2 | C1 | C0/SP |
|---|---|---|---|---|---|---|---|
| T3,0 | T3,0 | T2,1 | T2,0 | T1,1 | T1,0 | T0,1 | T0,0 |
| T7,1 | T7,0 | T6,1 | T6,0 | T5,1 | T5,0 | T4,1 | T4,0 |
| AC | R | CANDIDATE RS INDEX OR R BITS | | | | | |
| ... | | | | | | | |
| AC | R | CANDIDATE RS INDEX OR R BITS | | | | | |

FIG. 7

| C7 | C6 | C5 | C4 | C3 | C2 | C1 | C0/SP |
|---|---|---|---|---|---|---|---|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| T3,1 | T3,0 | T2,1 | T2,0 | T1,1 | T1,0 | T0,1 | T0,0 |
| ... | ... | ... | ... | ... | ... | ... | ... |
| T31,1 | T31,0 | T30,1 | T30,0 | T29,1 | T29,0 | T28,1 | T28,0 |
| T7,1 | T7,0 | T6,1 | T6,0 | T5,1 | T5,0 | T4,1 | T4,0 |
| AC | R | CANDIDATE RS INDEX OR R BITS | | | | | |
| ... | | | | | | | |
| AC | R | CANDIDATE RS INDEX OR R BITS | | | | | |

FIG. 8

| C7 | C6 | C5 | C4 | C3 | C2 | C1 | C0/SP |
|---|---|---|---|---|---|---|---|
| R | R | Tk,1 | Tk,0 | Tj,1 | Tj,0 | Ti,1 | Ti,0 |
| AC | R | CANDIDATE RS INDEX OR R BITS | | | | | |
| AC | R | CANDIDATE RS INDEX OR R BITS | | | | | |

FIG. 9

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (also referred to as, for example, "5th generation mobile communication system (5G)," "5G+(plus)," "6th generation mobile communication system (6G)," "New Radio (NR)," "3GPP Rel. 15 (or later versions)," and so on) are also under study.

In existing LTE systems (LTE Rel. 8 to Rel. 15), radio link quality monitoring (radio link monitoring (RLM)) is performed. Detection of radio link failure (RLF) by the RLM requests a user terminal (User Equipment (UE)) to perform RRC (Radio Resource Control) connection re-establishment.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), performing procedures for switching to another beam in response to detection of beam failure (which may be referred to as beam failure recovery (BFR) procedures, BFR, link recovery procedures, and so on) is under study.

In Rel. 17 (or later version) NR, it is also assumed that a terminal (UE) performs communication by using a plurality of transmission/reception points (TRPs)/UE panels. In this case, it is conceivable that beam failure detection is performed in the plurality of the TRPs/the plurality of the UE panels, but how to control beam failure detection (BFD) or beam failure recovery (BFR) in each TRP/UE panel becomes an issue. Unless the beam failure detection or beam failure recovery in each TRP/UE panel is appropriately controlled, communication throughput reduction or communication quality degradation may occur.

The present disclosure has been made in view of the above-described respects, and an object of the present disclosure is to provide a terminal, a radio communication method, and a base station that can appropriately perform beam failure detection or beam failure recovery even when using a plurality of transmission/reception points.

Solution to Problem

A terminal according to one aspect of the present disclosure includes a receiving section that receives one or more beam failure detection reference signals (BFD-RSs) corresponding to a plurality of transmission/reception points, and a control section that, when radio link quality of at least part of configured BFD-RSs is less than a threshold value, controls beam failure recovery procedure in units of one transmission/reception point or in units of a transmission/reception point set including a plurality of transmission/reception points.

Advantageous Effects of Invention

According to one aspect of the present disclosure, it is possible to appropriately perform beam failure detection or beam failure recovery even when using a plurality of transmission/reception points.

BRIEF DESCRIPTION OF DRAWINGS

FIG. 4 is a diagram to show an example of a case where BFR procedure according to a second embodiment is applied.

FIG. 5 is a diagram to show another example of the case where BFR procedure according to the second embodiment is applied.

FIG. 7 is a diagram to show an example of a first MAC CE structure according to a fourth embodiment.

FIG. 8 is a diagram to show another example of the first MAC CE structure according to the fourth embodiment.

FIG. 9 is a diagram to show an example of a second MAC CE structure according to the fourth embodiment.

DESCRIPTION OF EMBODIMENTS

Beam Failure Detection

In NR, communication is performed with use of beam forming. For example, a UE and a base station (e.g., gNB (gNodeB)) may use a beam used for signal transmission (also referred to as a transmit beam, Tx beam, and so on) and a beam used for signal reception (also referred to as a receive beam, Rx beam, and so on).

Using beam forming causes vulnerability to interference from an obstruction, and thus it is assumed that radio link quality deteriorates. Due to deterioration of the radio link quality, radio link failure (RLF) may occur frequently. Occurrence of RLF requires reconnection of a cell, and thus frequent occurrence of RLF causes deterioration of system throughput.

In NR, procedure for switching to another beam (which may be referred to as beam recovery (BR), beam failure recovery (BFR), L1/L2 (Layer 1/Layer 2) beam recovery, and so on) is performed in order to suppress occurrence of RLF when quality of a specific beam deteriorates. Note that BFR procedure may be simply referred to as BFR.

Note that beam failure (BF) of the present disclosure may be referred to as link failure.

Figure 1:
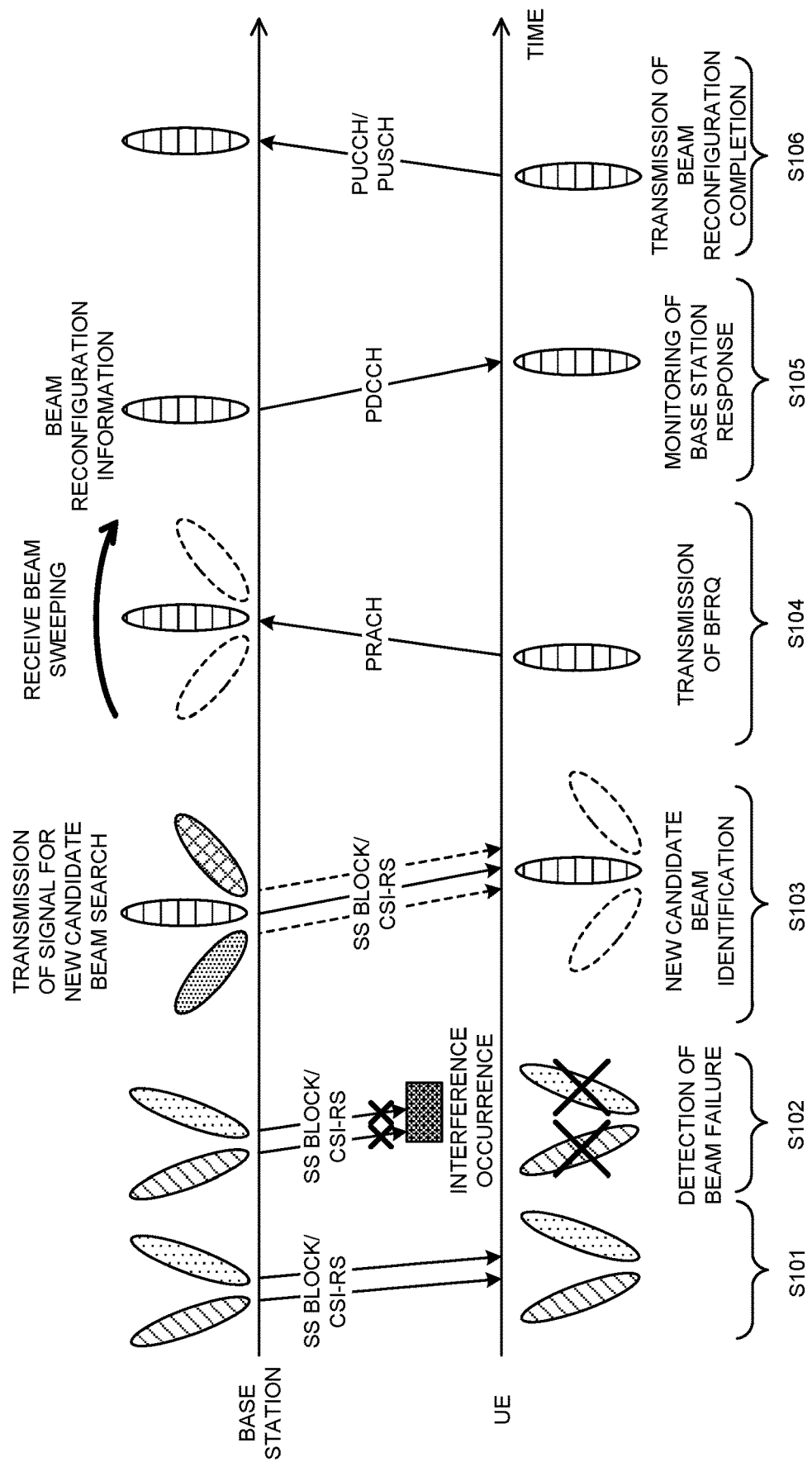
FIG. 1 is a diagram to show an example of a beam recovery procedure in Rel. 15 NR.

FIG. 1 is a diagram to show an example of the beam recovery procedure in Rel. 15 NR. The number of beams and the like are merely examples, and are not limited to this. In an initial state (step S101) of FIG. 1, the UE performs measurement based on a reference signal (RS) resource transmitted with use of two beams.

The RS may be at least one of a synchronization signal block (SSB) and an RS for channel state measurement (Channel State Information RS (CSI-RS)). Note that the SSB may be referred to as an SS/PBCH (Physical Broadcast Channel) block and so on.

The RS may be at least one of a primary synchronization signal (Primary SS (PSS)), a secondary synchronization signal (Secondary SS (SSS)), a mobility reference signal (Mobility RS (MRS)), a signal included in the SSB, the SSB, the CSI-RS, a demodulation reference signal (DMRS), a beam-specific signal, and the like, or may be a signal constituted by expanding, changing, and the like these signals. The RS measured at step S101 may be referred to as an RS for beam failure detection (Beam Failure Detection RS (BFD-RS)), a beam failure detection RS, an RS for use of beam recovery procedure (BFR-RS), and so on.

At step S102, due to interference of a radio wave from the base station, the UE fails to detect the BFD-RS (or reception quality of the RS deteriorates). Such interference may occur due to, for example, influence of an obstruction, phasing, interference, and the like between the UE and the base station.

The UE detects beam failure when a certain condition is satisfied. For example, the UE may detect occurrence of the beam failure when a BLER (Block Error Rate) with respect to all of configured BFD-RSs (BFD-RS resource configurations) is less than a threshold value. When occurrence of the beam failure is detected, a lower layer (physical (PHY) layer) of the UE may notify (indicate) a higher layer (MAC layer) of a beam failure instance.

Note that judgment standards (criteria) are not limited to the BLER, and may be reference signal received power in the physical layer (Layer 1 Reference Signal Received Power (L1-RSRP)). In place of the RS measurement or in addition to the RS measurement, beam failure detection may be performed on the basis of a downlink control channel (Physical Downlink Control Channel (PDCCH)) and the like. The BFD-RS may be expected to be quasi-co-location (QCL) with a DMRS for a PDCCH monitored by the UE.

Here, QCL is an indicator indicating statistical properties of the channel. For example, when a certain signal/channel and another signal/channel are in a relationship of QCL, it may be indicated that it is assumable that at least one of doppler shift, a doppler spread, an average delay, a delay spread, and a spatial parameter (for example, a spatial reception parameter (Spatial Rx Parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

Information related to the BFD-RS (e.g., indices, resources, numbers, the number of ports, precoding, and the like for the RS), information related to the beam failure detection (BFD) (e.g., the above-mentioned threshold value), and the like may be configured (notified) for the UE with use of higher layer signaling or the like. The information related to the BFD-RS may be referred to as information related to resources for BFR and so on.

In the present disclosure, the higher layer signaling may be, for example, any one or combinations of RRC (Radio Resource Control) signaling, MAC (Medium Access Control) signaling, broadcast information, and the like.

For example, the MAC signaling may use media access control control elements (MAC CEs (Control Elements)), MAC PDUs (Protocol Data Units), and the like. The broadcast information may be, for example, a master information block (MIB), a system information block (SIB), minimum system information (Remaining Minimum System Information (RMSI)), other system information (OSI), or the like.

The higher layer (e.g., MAC layer) of the UE may start a certain timer (which may be referred to as a beam failure detection timer) when receiving beam failure instance notification from the PHY layer of the UE. The MAC layer of the UE may trigger BFR (e.g., start any one of random access procedures mentioned later) when receiving the beam failure instance notification certain times (e.g., beamFailureInstanceMaxCount configured by RRC) or more until the timer expires.

When there is no notification from the UE or when receiving a certain signal (beam recovery request at step S104) from the UE, the base station may judge that the UE has detected beam failure.

At step S103, for beam recovery, the UE starts a search for a new candidate beam used for new communication. The UE may select the new candidate beam corresponding to the RS by measuring a certain RS. The RS measured at step S103 may be referred to as a new candidate RS, an RS for new candidate beam identification (New Candidate Beam Identification RS (NCBI-RS)), a CBI-RS, a CB-RS (Candidate Beam RS), and so on. The NCBI-RS may be the same as the BFD-RS, or may be different from the BFD-RS. Note that the new candidate beam may be simply referred to as a candidate beam or a candidate RS.

The UE may determine a beam corresponding to an RS satisfying a certain condition as the new candidate beam. For example, the UE may determine the new candidate beam on the basis of an RS with an L1-RSRP exceeding a threshold value out of configured NCBI-RSs. Note that judgment criteria are not limited to the L1-RSRP. The L1-RSRP related to an SSB may be referred to as an SS-RSRP. The L1-RSRP related to a CSI-RS may be referred to as a CSI-RSRP.

Information related to the NCBI-RS (e.g., resources, numbers, the number of ports, precoding, and the like for the RS), information related to new candidate beam identification (NCBI) (e.g., the above-mentioned threshold value), and the like may be configured (notified) for the UE with use of higher layer signaling or the like. The information related to the new candidate RS (or NCBI-RS) may be obtained on the basis of information related to the BFD-RS. The information related to the NCBI-RS may be referred to as information related to resources for NBCI and so on.

Note that the BFD-RS, the NCBI-RS, and the like may be interpreted as a radio link monitoring reference signal (Radio Link Monitoring RS (RLM-RS)).

At step S104, the UE that has identified the new candidate beam transmits a beam recovery request (Beam Failure Recovery reQuest (BFRQ)). The beam recovery request may be referred to as a beam recovery request signal, a beam failure recovery request signal, and so on.

The BFRQ may be transmitted with use of, for example, at least one of an uplink control channel (Physical Uplink Control Channel (PUCCH)), a random access channel (Physical Random Access Channel (PRACH)), an uplink shared channel (Physical Uplink Shared Channel (PUSCH)), and a configured grant (CG) PUSCH.

The BFRQ may include information about the new candidate beam/new candidate RS identified at step S103. Resources for the BFRQ may be associated with the new candidate beam. The information about the beam may be notified with use of a beam index (BI), a port index for a certain reference signal, an RS index, a resource index (e.g., a CSI-RS resource indicator (CRI)), an SSB resource indicator (SSBRI), or the like.

For Rel. 15 NR, CB-BFR (Contention-Based BFR) being BFR based on contention type random access (Random Access (PA)) procedure and CF-BFR (Contention-Free BFR) being BFR based on non-contention type random access procedure are under study. In the CB-BFR and CF-BFR, the UE may transmit a preamble (also referred to as an RA preamble, a random access channel (Physical Random Access Channel (PRACH)), a RACH preamble, and so on) as the BFRQ by using PRACH resources.

In the CB-BFR, the UE may transmit a preamble randomly selected from one or a plurality of preambles. On the other hand, in the CF-BFR, the UE may transmit a preamble UE-specifically assigned by the base station. In the CB-BFR, the base station may assign an identical preamble to a plurality of UEs. In the CF-BFR, the base station may separately assign a preamble for the UE.

Note that the CB-BFR and CF-BFR may be referred to as CB PRACH-based BFR (contention-based PRACH-based BFR (CBRA-BFR)) and CF PRACH-based BFR (contention-free PRACH-based BFR (CFRA-BFR)), respectively. The CBRA-BFR may be referred to as CBRA for BFR. The CFRA-BFR may be referred to as CFRA for BFR.

Even in any of the CB-BFR and CF-BFR, information related to a PRACH resource (PA preamble) may be notified by, for example, higher layer signaling (RRC signaling or the like). For example, the information may include information indicating correspondence between a detected DL-RS (beam) and PRACH resource, and a different PRACH resource may be associated with the information for each DL-RS.

At step S105, the base station that has detected the BFRQ transmits a response signal (which may be referred to as gNB response and so on) to the BFRQ from the UE. Reconfiguration information (e.g., DL-RS resource configuration information) about one or a plurality of beams may be included in the response signal.

The response signal may be transmitted in, for example, a UE-common search space of a PDCCH. The response signal may be notified with use of a PDCCH (DCI) cyclic redundancy check (CRC)-scrambled by a UE identifier (e.g., a cell-radio RNTI (C-RNTI)). The UE may judge, on the basis of beam reconfiguration information, at least one of a transmit beam and a receive beam to be used.

The UE may monitor the response signal on the basis of at least one of a control resource set (COntrol REsource SET (CORESET)) for BFR and a search space set for BFR.

Regarding the CB-BFR, when the UE receives the PDCCH corresponding to the C-RNTI related to the UE itself, it may be judged that contention resolution is successful.

With respect to a process at step S105, a period for the UE to monitor response from the base station (e.g., gNB) to the BFRQ may be configured. The period may be referred to as, for example, a gNB response window, a gNB window, a beam recovery request response window, and so on. The UE may perform retransmission of the BFRQ when there is no gNB response detected in the window period.

At step S106, the UE may transmit a message indicating that beam reconfiguration for the base station has been completed. For example, the message may be transmitted by a PUCCH, or may be transmitted by a PUSCH.

Beam recovery success (BR success) may represent, for example, a case where step S106 has been reached. On the other hand, beam recovery failure (BR failure) may correspond to, for example, a case that BFRQ transmission has reached a certain number of times or a case that a beam failure recovery timer (Beam-failure-recovery-Timer) has expired.

In Rel. 15, performing beam recovery procedure (e.g., BFRQ notification) for beam failure detected in an SpCell (PCell/PSCell) by using the random access procedure is supported. On the other hand, in Rel. 16, performing beam recovery procedure (e.g., BFRQ notification) for beam failure detected in an SCell by using at least one of PUCCH (e.g., scheduling request (SR)) transmission for BFR and MAC CE (e.g., UL-SCH) transmission for BFR is supported.

For example, the UE may transmit information related to beam failure by using MAC CE-based 2 steps. The information related to beam failure may include information related to a cell in which the beam failure is detected and information related to the new candidate beam (or new candidate RS index).

Step 1

When BF is detected, PUCCH-BFR (scheduling request (SR)) may be transmitted to a PCell/PSCell from the UE.

Subsequently, a UL grant (DCI) for step 2 described below may be transmitted to the UE from the PCell/PSCell. In a case where beam failure is detected, when a MAC CE (or UL-SCH) for transmission of the information related to the new candidate beam exists, step 1 (e.g., PUCCH transmission) may be omitted, and step 2 (e.g., MAC CE transmission) may be performed.

Step 2

Subsequently, the UE may transmit information (e.g., a cell index) related to a (failed) cell in which beam failure is detected and the information related to the new candidate beam to the base station (PCell/PSCell) by using the MAC CE via an uplink channel (e.g., a PUSCH). After that, after a certain period (e.g., 28 symbols) from reception of a response signal from the base station through the BFR procedure, QCL for a PDCCH/PUCCH/PDSCH/PUSCH may be updated to a new beam.

Note that numbers for these steps are just numbers for illustration, and a plurality of steps may be organized, or the order of these steps may be changed. Whether BFR is performed may be configured for the UE with use of higher layer signaling.

Incidentally, for future radio communication systems (e.g., Rel. 17 (or later versions)), enhancement of beam management of a UE having a plurality of panels (multiple panels) or beam management using a plurality of transmission/reception points (multiple Transmission/Reception Points (TRPs)) is under study.

Thus, when a terminal (UE) performs communication by using a plurality of transmission/reception points (TRPs)/UE panels, it is conceivable that beam failure detection is performed for each of plurality of TRPs/plurality of UE panels. However, how to control beam failure detection (BFD) or beam failure recovery (BFR) procedure in each TRP/UE panel has not been fully studied. Unless the beam failure recovery procedure (or radio link recovery procedure) in each TRP/UE panel is appropriately controlled, communication throughput reduction or communication quality degradation may occur.

The inventors of the present invention focused on a possibility that beam failure recovery procedure (UE operation based on beam failure detection/beam failure recovery request/beam failure recovery) is applied in units of one or more TRPs/panels, studied a method for appropriately controlling the beam failure recovery procedure in units of TRPs/units of panels, and came up with the idea of the present embodiment.

Hereinafter, embodiments according to the present disclosure will be described in detail with reference to the drawings. Aspects according to respective embodiments may each be employed individually, or may be employed in combination.

In the present disclosure, the UE may be a UE that performs transmission/reception with a TRP by using a plurality of panels. Each panel may correspond to a separate TRP, one panel may correspond to a plurality of TRPs, or the plurality of the panels may correspond to one TRP.

In the present disclosure, a UE panel (panel index) may correspond to a specific group. In this case, the UE may assume that a beam/RS for each group is measured in each panel of the UE. The UE may assume that beams for a plurality of groups are simultaneously received (with use of different panels).

In the present disclosure, a TRP may be interchangeably interpreted as a TRP (or base station) panel, an RS group, an antenna port group, a spatial relation group, a QCL group, a TCI state, a TCI state group, a CORESET group, a CORESET pool, and the like. A TRP index may also be interchangeably interpreted as an RS group index, an antenna port group index, a QCL group index, a TCI state index, a TCI state group index, a CORESET group index, a CORESET pool index, and the like.

In the present disclosure, when single DCI is applied, a n th TRP (n is an arbitrary integer (e.g., 1 or 2)) may correspond to a n th TCI state or a n th code division multiplexing (CDM) group.

In the present disclosure, when multiple pieces of DCI are applied, a first TRP may correspond to a CORESET without CORESETPoolIndex or a CORESET with CORESETPoolIndex=0. A second TRP may correspond to a CORESET with CORESETPoolIndex=1.

In the present disclosure, a UE panel may be interchangeably interpreted as an RS group, an antenna port group, a spatial relation group, a QCL group, a TCI state group, a CORESET group, and the like.

In the present disclosure, the panel may be associated with a group index for an SSB/CSI-RS group. In the present disclosure, the panel may also be associated with a TRP. In the present disclosure, the plurality of the panels may be associated with a group index for a group beam-based report. In the present disclosure, the panel may also be associated with a group index for an SSB/CSI-RS group for the group beam-based report.

In the present disclosure, a serving cell/cell may be interpreted as a PCell, a PSCell, or an SCell. Descriptions below use, as an example, a case where two TRPs corresponds to the serving cell, but three or more TRPs may correspond to the serving cell.

In the present disclosure, a BFD RS with detected beam failure, a failed BFD RS, a TRP with detected beam failure, a failed TRP, a UE panel in which beam failure is detected, and a failed UE panel may be interchangeably interpreted.

In the present disclosure, A/B may mean at least one of A and B. In the present disclosure, A/B/C may mean at least one of A, B, and C.

Beam Failure Detection/New Candidate Beam Notification Control

First Embodiment

In a first embodiment, a case where a UE, when detecting beam failure, performs notification related to the detected beam failure (e.g., BFD) in units of TRPs or units of TRP sets including a plurality of TRPs will be described.

The notification related to BFD may indicate a case where the notification is performed for a higher layer (higher layers) from a physical layer in the UE, or may indicate a case where the notification is performed for a network (e.g., a base station) from the UE. The physical layer may be interpreted as a lower layer. The notification related to BFD may be notification of detection of beam failure or notification of information related to a new candidate beam (e.g., information related to an RS index or information related to a resource structure/resource configuration).

One or a plurality of reference signal sets used for beam failure detection may be configured for the UE. The reference signal sets used for beam failure detection may be referred to as RS sets, BFD-RS sets, BFR-RS sets, or sets q0. It is only necessary that the RS set includes at least one or more RSs or RS resource configurations. The RS set may be simply interpreted as an RS.

One or a plurality (also hereinafter referred to as one or more) of RS sets may be separately configured for each TRP. In this case, a separate RS/RS set may be associated with each TRP. That is, a TRP-specific RS (TRP-specific BFR-RS/BFD-RS) may be configured/defined. Alternatively, an RS/RS set common to a plurality of TRPs may be configured/defined.

The UE may perform notification related to beam failure detection (BFD) for the higher layer from the physical layer when all RSs included in the configured RS sets (or sets q0) are less than a certain threshold value (threshold). The notification related to BFD may be performed at intervals of a certain cycle. Note that the UE may perform the notification related to BFD when some RSs, instead of all RSs, are less than the certain threshold value.

The UE may perform BFD notification for the higher layer from the physical layer when RSs (all RSs or some RSs) included in an RS set corresponding to some TRPs are less than a certain threshold value. For example, assume a case where two of TRP #0 and TRP #1 are configured for a certain serving cell, RS set #0 is configured for TRP #0, and RS set #1 is configured for TRP #1.

The UE may perform BFD notification when only RSs included in an RS set corresponding to either TRP (e.g., TRP #0) are less than a certain threshold value. In this case, the UE may notify information related to a TRP (e.g., TRP #0) in which BFD is detected (see FIG. 2). In the present disclosure, the information related to the TRP may be at least one of a TRP index (TRP-ID), a reference signal group index (RS group-ID), an RS set index (RS set-ID), and a control resource set pool index (CORESETPoolindex). Therefore, it is possible to acknowledge information about a TRP in which beam failure is detected (or beam failure has occurred) on a side of the higher layer.

Alternatively, the UE may perform BFD notification for the higher layer from the physical layer when RSs (all RSs or some RSs) included in RS sets each corresponding to each TRP (or all TRPs) are less than a certain threshold value. For example, assume a case where two of TRP #0 and TRP #1 are configured for a certain cell, RS set #0 is configured for TRP #0, and RS set #1 is configured for TRP #1.

Figure 3:
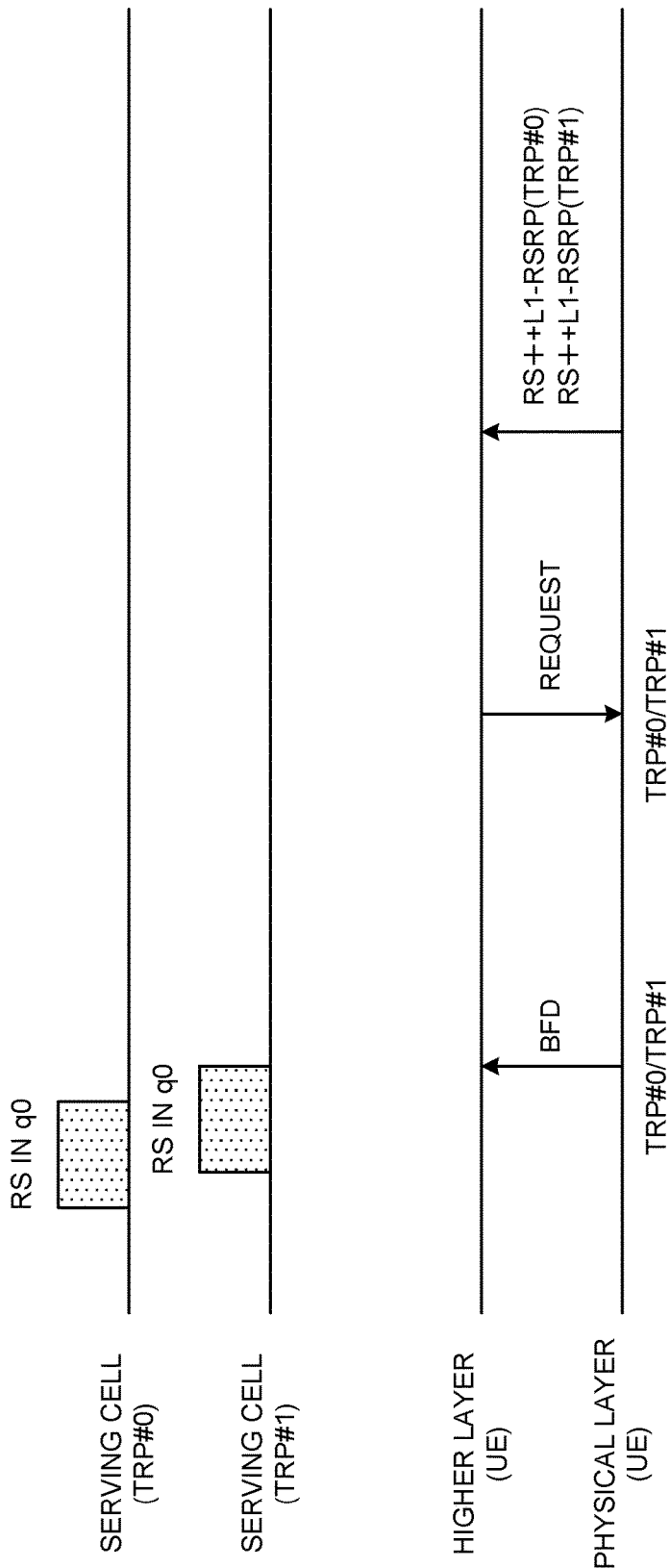
FIG. 3 is a diagram to show another example of the BFR procedure according to the first embodiment.

The UE may perform BFD notification when an RS included in RS set #0 corresponding to TRP #0 and an RS included in RS set #1 corresponding to TRP #1 are less than a certain threshold value (refer to FIG. 3). Notification of BFD of TRP #0 and notification of BFD of TRP #1 may be separately performed, or may be performed at the same time (e.g., one notification).

In this case, the UE may not include information related to TRPs (e.g., TRP indices) in information related to BFD. Alternatively, the UE may include information related to a plurality of TRPs (e.g., TRP #0 and TRP #1) in information (one notification) related to BFD. Alternatively, the UE may include specific information (or a specific value) in the information related to BFD (see FIG. 3). The specific value may indicate BFD of the plurality of the TRPs (e.g., TRP #0 and TRP #1).

Note that when a common RS set is configured for TRP #0 and TRP #1, an RS included in the common RS set is less than a certain threshold value, BFD notification may be performed.

After the information related to BFD is notified to the higher layer from the physical layer, the higher layer may request the physical layer to notify at least one of the presence or absence of existence of an RS with received power (e.g., RSRP) being a certain threshold value or more and information related to the RS (e.g., an RS index/RS configuration index/RSRP).

The information related to the RS may be a candidate RS corresponding to the new candidate beam, and the RS may be selected from RSs included in a certain RS set (or set q1). The certain RS set (or RS included in the RS set) may be notified/configured for the UE from the network with use of higher layer signaling or the like.

When the request from the higher layers exists, the UE notifies the higher layer of whether a candidate RS capable of being used for the new candidate beam exists. The UE may, in response to the request, notify the higher layer of information related to at least one of a new candidate RS and RSRP (e.g., L1-RSRP) being a certain threshold value or more from the physical layer.

Information notified to the higher layer from the lower layer on the basis of the request may be determined on the basis of at least one of option 1-1 and option 1-2 below.

Option 1-1

Figure 2:
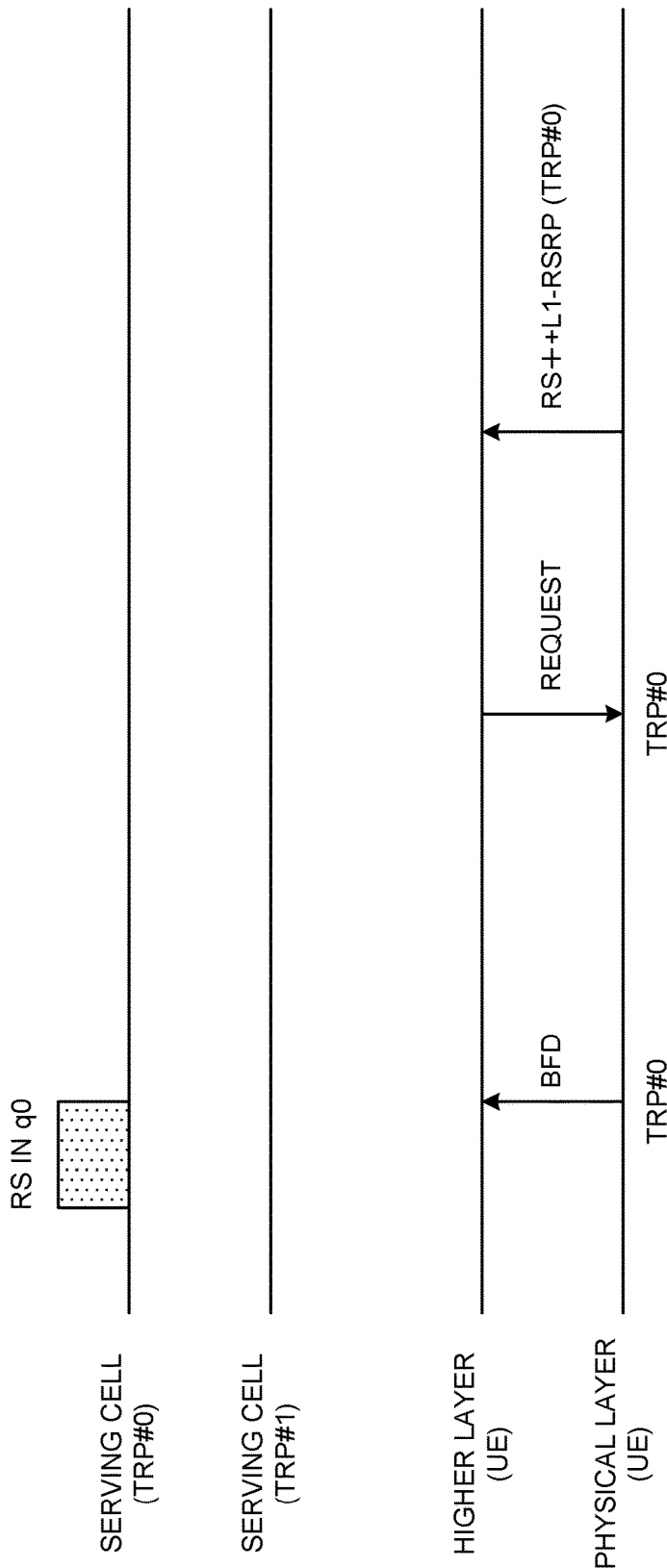
FIG. 2 is a diagram to show an example of BFR procedure according to a first embodiment.

Assume a case where the UE detects beam failure in some (e.g., one) TRPs of a plurality of TRPs and BFD related to the some TRPs is notified to the higher layer from the lower layer (see FIG. 2). When a request from the higher layer exists on the basis of the BFD notification, the UE may notify the higher layer of whether an RS with received power being a certain threshold value or more exists in an RS set (or q1 set) corresponding to the TRP, or may notify the higher layer of information related to the RS when the RS exists.

FIG. 2 shows a case where BFD of TRP #0 is detected and BFD of TRP #1 is not detected. The information notified to the higher layer may be the same as information notified in BFR procedure of Rel. 15/Rel. 16. The higher layer can judge, on the basis of information notified from the lower layer, a candidate beam (or candidate RS) for a TRP in which the beam failure has occurred.

Assume a case where the UE detects beam failure in (e.g., two) TRPs of a plurality of TRPs and BFD related to the plurality of the TRPs is notified to the higher layer from the lower layer (see FIG. 3). When a request from the higher layer exists on the basis of the BFD notification, the UE may notify the higher layer of information (e.g., two sets of candidate beam information) related to new candidate beams/candidate RSs each corresponding to each TRP (option 1-1a).

For example, the UE may notify, to the higher layer, whether an RS with received power being a certain threshold value or more exists in RS sets (or q1 sets) each corresponding to each TRP and each piece of information related to RSs each corresponding to each TRP, if any exist. When notifying the two sets of candidate beam information (e.g., RS indices/RSRPs or the like), the UE may determine a sequence of information notified on the basis of TRP indices. For example, in the notified information, information about a TRP with a smaller index and received power corresponding to the TRP may be arranged at the beginning, and information about a TRP with a smaller index and received power corresponding to the TRP may be subsequently arranged.

Alternatively, the UE may notify the higher layer of information related to one (or common/1 set of) new candidate beam (or candidate RS) with respect to a plurality of TRPs (e.g., two TRPs) (option 1-1b). The one (or 1 set of) new candidate beam may be a new candidate beam corresponding to a specific TRP. The specific TRP may be a TRP with the smallest (or largest) index.

Option 1-1b may be employed in a limited cell (limited to, for example, a PCell/PSCell), or may be employed in any cells.

Option 1-2

Requested information from the higher layer may include the information related to TRPs. That is, the higher layer may indicate the physical layer so as to notify a new candidate beam (or candidate RS) for a certain TRP. The higher layer may request notification of the new candidate beam for one TRP, or may request notification of the new candidate beam for a plurality of (e.g., two) TRPs.

When detecting beam failure in a requested TRP, the UE may provide information related to a candidate beam for only the requested TRP to the higher layer from the lower layer. Therefore, it is possible to suppress an increase in the amount of information notified to the higher layer from the lower layer.

Thus, notification/report of beam failure detection and notification/report of information related to the new candidate beam are controlled in units of TRPs, and thus BFR procedure can be flexibly controlled in the units of TRPs.

Second Embodiment

In a second embodiment, a case where a UE, when detecting beam failure, performs transmission of a recovery request for the detected beam failure (or triggering of the recovery request) in units of TRPs or units of TRP sets including a plurality of TRPs will be described.

In a beam failure detection (BFD) operation, the UE (or MAC entity) may control triggering of a beam failure recovery request (e.g., BFR) by using a certain counter (e.g., BFI_COUNTER) to count notification of a beam failure instance (e.g., beam failure instance) and a certain timer (e.g., beamFailureDetectionTimer).

With respect to a certain cell, when receiving notification of the beam failure instance from a lower layer, the UE may start (or restart) the certain timer, and may increase the certain counter (e.g., increment of 1). When the certain counter becomes a maximum count (e.g., beamFailureInstanceMaxCount) or more, the UE may perform a beam failure recovery operation for the cell. When the cell is an SCell, the UE may trigger BFR for the SCell. In a case other than that (e.g., a case where the cell is an SpCell), the UE may start random access procedure in the SpCell.

When the certain timer expires, the certain counter may be set to 0 when a reference signal used for the certain timer/maximum count/BFD is reconfigured.

At least one of the certain timer (e.g., beamFailureDetectionTimer) and the certain counter (e.g., BFI_COUNTER) may be configured/defined in units of TRPs or units of TRP sets including a plurality of TRPs. That is, in a serving cell for which one or more BFR-RS sets are configured, a certain TRP-specific counter/timer may be applied.

For example, the UE may separately apply the certain counter/certain timer to each TRP of a certain serving cell. Counter #0 may be configured/defined for TRP #0, and counter #1 may be configured/defined for TRP #1. Timer #0 may be configured/defined for TRP #0, and timer #1 may be configured/defined for TRP #1. The maximum count (e.g., beamFailureInstanceMaxCount) may be separately (TRP-specific) configured for each TRP, or may be commonly (TRP-common) configured for a plurality of TRPs.

The UE may trigger BFR for the serving cell when either of certain counter #0 and certain counter #1 becomes the maximum count or more. That is, the UE may trigger BFR for a cell including TRP #0 and TRP #1 (e.g., BFR for one TRP) even when both of certain counter #0 corresponding to TRP #0 and certain counter #1 corresponding to TRP #1 do not become the maximum count or more (see case 1/case 2 of FIG. 4).

In this case, even for an SpCell (PCell/PSCell), MAC CE-based 2-step BFR (BFR MAC CE), instead of the random access procedure, may be triggered when beam failure is detected in only one TRP included in the cell. The BFR MAC CE may be a structure to which an existing system (e.g., Rel. 16) is enhanced (e.g., 2-step with enhanced BFR MAC CE). The enhanced BFR MAC CE may include information related to TRPs and information related to a new candidate beam (or new candidate RS) for each TRP of the serving cell.

The UE may control beam failure recovery procedure depending on cell types when both of certain counter #0 and certain counter #1 become the maximum count or more (see case 3/case 4 of FIG. 4).

For example, the MAC CE-based 2-step BFR (BFR MAC CE) may be triggered when the cell is an SCell (case 3 of FIG. 4). In this case, a structure to trigger BFR for the SCell (option 2-1) may be employed, or a structure to trigger each BFR for each TRP of the SCell (option 2-2) may be employed. In option 2-1, information related to one new candidate RS corresponding to the cell or specific TRP may be notified. In option 2-2, information related to two new candidate RSs corresponding to two TRPs may be notified.

In option 2-1, when beam failure recovery for the cell has been successfully completed, two certain counters for two TRPs may be set to 0, and two certain timers for the two TRPs may be stopped.

In option 2-2, when beam failure recovery for the TRP has been successfully completed, certain counters for each TRP may be set to 0, and two certain timers for the each TRP may be stopped.

In a case other than that (e.g., a case where the cell is an SpCell), the random access procedure may be started in the SpCell (see case 4 of FIG. 4).

When one candidate RS (or candidate beam) is obtained from a higher layer, the UE may apply a RACH for BFR. When a plurality of (e.g., two) candidate RSs are obtained from the higher layer, the UE may select one candidate RS to apply the RACH for BFR.

In a method for selecting one candidate RS from the plurality of the candidate RSs, the one candidate RS may be autonomously selected by the UE depending on UE implementation, may be selected on the basis of TRP indices, or may be selected on the basis of candidate RS indices. For example, a candidate RS corresponding to a TRP with the smallest (or largest) index may be selected. Alternatively, a candidate RS with the smallest (or largest) RS/RS resource index may be selected.

Alternatively, also in a case where both of certain counter #0 and certain counter #1 become the maximum count or more (or a case where BFR has occurred in a plurality of TRPs), 2-step BFR procedure including the BFR MAC CE may be performed regardless of cell types. That is, the MAC CE-based 2-step BFR (BFR MAC CE) may be triggered when beam failure in at least one TRP is detected (e.g., when a counter corresponding to at least one TRP becomes the maximum count or more) (see FIG. 5).

Thus, the certain timer/certain counter in beam recovery procedure is controlled in units of TRPs, and thus BFR procedure can be flexibly controlled in the units of TRPs.

Third Embodiment

In a third embodiment, BFR procedure (e.g., enhanced 2-step procedure based on a BFR MAC CE) in a case where BFR for one or a plurality of TRPs is triggered will be described.

2-Step BFR

When at least one piece of BFR is triggered, a UE may transmit the MAC CE for BFR when a UL-SCH capable of accommodating a BFR MAC CE (or Truncated BFR MAC CE) is available. In a case other than that (e.g., a case where there is no UL-SCH capable of being used for transmission of the BFR MAC CE), the UE may trigger (or transmit) an SR for BFR for an SCell.

Case 3A

For example, assume a case where one piece of BFR for one or more TRPs of a serving cell is triggered (or a case where BFR for one TRP is triggered in the serving cell). The UE may transmit the MAC CE for BFR when a UL-SCH capable of accommodating a BFR MAC CE (or Truncated BFR MAC CE) is available. In a case other than that (e.g., a case where there is no UL-SCH capable of being used for transmission of the BFR MAC CE), the UE may trigger (or transmit) an SR for BFR for an SCell.

Case 3B

For example, assume a case where a plurality of pieces of BFR for a plurality of (e.g., two) TRPs of a serving cell are triggered (or a case where BFR for two TRPs are each triggered in the serving cell). The UE may transmit the MAC CE for BFR when a UL-SCH capable of accommodating a BFR MAC CE (or Truncated BFR MAC CE) is available. In a case other than that (e.g., a case where there is no UL-SCH capable of being used for transmission of the BFR MAC CE), the UE may trigger (or transmit) an SR for BFR for an SCell.

In case 3A/case 3B, when the BFR MAC CE includes information related to beam failure detection for one TRP of the serving cell (e.g., information related to one TRP with the serving cell in which beam failure is detected), the UE may apply at least one of operation 3-1 and operation 3-2 described below.

For example, the UE may cancel all BFR triggered for the serving cell (or the plurality of the TRPs) (operation 3-1). Operation 3-1 may be employed in only an SpCell (e.g., a PCell/PSCell).

Alternatively, the UE may cancel all BFR triggered for a certain TRP (e.g., a TRP in which beam failure is detected) (operation 3-2). Operation 3-2 may be employed in only an SCell.

When the BFR MAC CE includes information related to beam failure detection for a plurality of (e.g., two) TRPs of the serving cell (e.g., information related to two TRPs with the serving cell in which beam failure is detected), the UE may apply the above-described operation 3-1.

In case 1 and case 2, resources used for an SR trigger (or SR transmission using a PUCCH) may be separately configured.

The SR (or PUCCH transmission) for BFR may be defined/configured for at least one of an SpCell (PCell/PSCell) and an SCell for which a multi-TRP configuration (e.g., multi-TRP config) is configured.

One SR (or SR index/SR resource/SR configuration/PUCCH resource/PUCCH configuration) may be configured for 2-step BFR (aspect 3-1). In the above-described case 1/case 2, the SR may be triggered when the MAC CE is not available or the UL-SCH fails to accommodate the BFR MAC CE.

Alternatively, a TRP-specific SR (e.g., TRP-specific SR) may be configured for the 2-step BFR (aspect 3-2). When a plurality of (e.g., two) TRPs are configured, a plurality of (e.g., two) SRs (or SR indices/SR resources/SR configurations/PUCCH resources/PUCCH configurations) may each be configured for the 2-step BFR.

In aspect 3-2, the plurality of the SRs may be configured on the basis of at least one of the following options 3A to 3C.

Option 3A

A plurality of SRs (e.g., scheduling request IDs) each corresponding to each TRP may be configured. That is, SR indices may be separately (independently) configured for each TRP.

Option 3B

One SR (e.g., a scheduling request ID) may be configured, and the SR may have a plurality of PUCCH resources each corresponding to each TRP. That is, an SR may be commonly configured for the plurality of the TRPs, and PUCCH resources corresponding to the SR may be separately configured for each TRP.

Option 3C

One SR (e.g., a scheduling request ID) may be configured, the SR may have one PUCCH resource, and a plurality of pieces of QCL/beams/spatial relations each corresponding to each TRP may be configured for the PUCCH resource. That is, an SR and a PUCCH resource may be commonly configured for the plurality of the TRPs, and QCL/beam/spatial relation corresponding to the PUCCH resource may be separately configured for each TRP.

For example, when beam failure is detected in TRP #0, an SR corresponding to another TRP (e.g., TRP #1) may be transmitted in the 2-step BFR.

Aspect 3-2 may be employed in only an SpCell for which multiple TRPs are configured. Alternatively, aspect 3-2 may be employed in an SCell.

UE Capability Information

In the above-described first embodiment to third embodiment, the following UE capabilities may be configured. Note that the following UE capability may be interpreted as a parameter (e.g., a higher layer parameter) configured for the UE from the network (e.g., the base station).

In beam failure detection, UE capability information related to whether to support RSs for a plurality of (e.g., two) sets/groups may be defined.

In detection of a new candidate beam (or new candidate RS), UE capability information related to whether to support RSs for a plurality of (e.g., two) sets/groups may be defined.

In information exchange between a physical layer (e.g., UE PHY) and a higher layer (e.g., UE higher layer) of the UE, UE capability information related to whether to support TRP index notification for a certain operation may be defined. The certain operation may be at least one of beam failure detection notification (beam failure indication), request from the higher layer (request from higher layer), and new candidate beam information (new candidate beam info).

UE capability information related to whether 2-step MAC CE-based BFR for a certain cell is supported may be defined. The certain cell may be, for example, an SpCell (e.g., a PCell/PSCell) for which multiple TRPs are configured.

UE capability information related to whether a plurality of (e.g., two) certain counters (e.g., BFI_COUNTER) are supported for the serving cell may be defined.

UE capability information related to whether a plurality of (e.g., two) certain timers (e.g., beamFailureDetectionTimer) are supported for the serving cell may be defined.

UE capability information related to whether a plurality of (e.g., two) BFR triggers are supported for the serving cell may be defined.

UE capability information related to whether a plurality of (e.g., two) SRs are supported for the serving cell may be defined.

UE capability information related to whether a structure in which the SRs are associated with TRPs is supported may be defined.

In a multi-TRP scenario, UE capability information related to whether an enhanced BFR MAC CE for a certain cell is supported may be defined. The certain cell may be an SpCell (e.g., a PCell/PSCell)/SCell.

The first aspect to third aspect may include a structure applied to a UE that supports/reports at least one of the above-mentioned UE capabilities. Alternatively, the first aspect to third aspect may include a structure applied to a UE configured from the network.

MAC CE Structure

Fourth Embodiment

In a fourth embodiment, a MAC CE structure used for BFR procedure (e.g., 2-step BFR) in a case where BFR for one or a plurality of TRPs is triggered will be described.

In Rel. 16 NR, BFR is performed with use of a MAC CE when quality of all BFD-RSs (or BFR-RSs) configured for a UE becomes a certain threshold value or less in an SCell. On the other hand, in Rel. 17 (or later versions), BFR may be performed with use of a MAC CE when quality of BFD-RSs (e.g., all BFD-RSs) corresponding to a certain TRP out of BFD-RSs configured for a UE becomes a certain threshold value or less.

For Rel. 16 NR, the UE that determines a certain beam having the best quality (e.g., maximum L1-RSRP) for each configured new candidate beam (or new candidate RS) is under study.

A BFR MAC CE for Rel. 16 (or earlier versions) may include at least one of a bit field to indicate a cell in which BF is detected, a reserved bit field, a candidate RS ID or reserved bit field (which may be simply referred to as a candidate RS ID field), a BFD indication field for an SpCell, and a field indicating existence of a candidate RS ID.

The reserved bit field may not be specifically used for notification of information, or may be freely used. In specifications, the reserved bit field may be fixed to a certain value (e.g., 0).

Figure 6B:
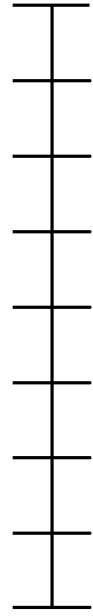
FIG. 6A and FIG. 6B are diagrams to show a structure of a BFR MAC CE for Rel. 16 (or earlier versions).
Figure 6A:
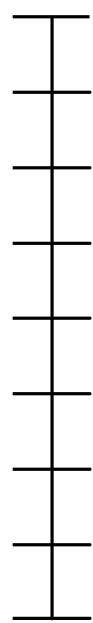

FIG. 6A and FIG. 6B are diagrams to show a structure of the BFR MAC CE for Rel. 16 (or earlier versions). FIG. 6A shows an example of a MAC CE structure for 8 or less cells (or 7 or less SCells) in a case where a field to indicate a cell in which BF is detected is included. FIG. 6B shows an example of a MAC CE structure for 32 or less cells in a case where a field to indicate a cell in which BF is detected is included.

In FIG. 6A and FIG. 6B, Cn bit (n is an integer equal to or larger than 1) is the bit field to indicate a cell in which BF is detected, SP bit is the BFD indication field for an SpCell, AC bit is the field indicating existence of a candidate RS ID, and R bit is a reserved bit. Hereinafter, in the present disclosure, Cn bit and R bit in a diagram to show the MAC CE structure are similar.

On the other hand, in Rel. 17 (or later versions), detection of beam failure (notification of a cell in which BFD is detected)/notification of a new candidate RS may be controlled for each TRP (or in units of TRPs).

For example, the UE may transmit, in addition to information (e.g., a cell index) related to a (failed) cell in which beam failure is detected and information (e.g., a new candidate RS index) related to a new beam, information (e.g., a TRP index) related to a failed TRP to a base station (e.g., a PCell/PSCell) by using a MAC CE (or UL-SCH/PUSCH).

Information (e.g., a TRP index) related to a TRP in which beam failure is detected may be information (e.g., a panel index) related to a panel in which beam failure is detected or information (e.g., a candidate RS ID) related to a new candidate beam associated with a UE panel/TRP.

A MAC CE (BFR MAC CE) structure used for BFR for notification of the information (e.g., the TRP index) related to a TRP in which beam failure is detected will be described below. When the TRP index is included in the MAC CE, the TRP index may have a bit length of a specific number of bits (e.g., N bits (N≥1)).

First BFR MAC CE Structure

The MAC CE may include TRP fields each corresponding to each cell (see FIG. 7). The TRP fields (e.g., TRP-ID indication fields) may be fields for notification of TRP indices (e.g., TRP-IDs) each corresponding to each cell.

FIG. 7 shows an example of the BFR MAC CE structure including the TRP indices. The MAC CE of FIG. 7 includes at least fields corresponding to 8 or less cells and TRP fields corresponding to each cell. For example, Ti,0 and Ti,1 correspond to cell i (Ci). Specifically, T0,0 and T0,1 correspond to cell 0 (C0/SP), T1,0 and T1,1 correspond to cell 1 (C1), and T7,0 and T7,1 correspond to cell 7 (C7). FIG. 7 shows a case where 2 bits (e.g., 1 bit of Ti,0 and 1 bit of Ti,1) are used for notification of a TRP index corresponding to a certain cell (e.g., Ci), but the present disclosure is not limited to this.

The fields are provided for each of a plurality of (here, two) TRPs each corresponding to each cell, and thus even when beam failure is detected in either TRP, it is possible to appropriately notify the TRP in which the beam failure is detected.

The TRP fields may be applied to only a case where a field for a corresponding cell index is a certain bit (e.g., Ci=1).

The certain bit may mean that beam failure is detected in the cell. A field (e.g., a Candidate RS ID or R bit) for notification of the new candidate RS index may be configured in the MAC CE for only a cell being the certain bit (or one or more TRPs corresponding to the cell being the certain bit).

For example, assume a case where $C_i=1$, $T_{i,1}=0$, and $T_{i,0}=1$ (case 4-1). In this case, existence of an octet including an SCell AC field having cell index i for TRP #0 may be indicated together with indication of beam failure detection for TRP #0 (e.g., first TRP). Note that Ti field values indicating case 1 are not limited to this, and may be $T_{i,1}=0$ and $T_{i,0}=0$.

For example, assume a case where $C_i=1$, $T_{i,1}=1$, and $T_{i,0}=0$ (case 4-2). In this case, existence of an octet including an SCell AC field having cell index i for TRP #1 may be indicated together with indication of beam failure detection for TRP #1 (e.g., second TRP). Note that Ti field values indicating case 2 are not limited to this, and may be $T_{i,1}=0$ and $T_{i,0}=1$.

For example, assume a case where $C_i=1$, $T_{i,1}=1$, and $T_{i,0}=1$ (case 4-3). In this case, beam failure detection in TRP #0 (e.g., first TRP) and beam failure detection in TRP #1 (e.g., second TRP) (beam failure detection in both TRPs) may be indicated. In this case, existence of an octet including an SCell AC field having cell index i for either TRP (or only TRP #0) may be indicated (option 4-1). Alternatively, existence of respective octets (two octets) including an SCell AC field having cell index i for both TRPs (TRP #0 and TRP #1) may be indicated (option 4-2). Note that Ti field values indicating case 3 are not limited to this, and may be $T_{i,1}=1$ and $T_{i,0}=0$.

When notification of beam failure detection in cell i for which multi-TRP BFR is not configured and notification of existence of an octet including an SCell AC field having cell index i are performed (case 4-4), the notifications may be controlled by cell fields/TRP fields as described below.

When $C_i=1$, $T_{i,1}=1$, and $T_{i,0}=1$, it may be indicated that a multi-TRP BFR configuration is not configured (option 4-A).

A case where $C_i=1$, $T_{i,1}=0$, and $T_{i,0}=1$ (or a case where $T_{i,1}=0$ and $T_{i,0}=0$) may mean that case 4 and case 1 (or case 2) share the same Ci and Ti value. The UE may judge a difference between case 4 and case 1 on the basis of a BFR configuration.

Note that FIG. 7 may be applied to a case where the number of SCells for which BFR is configured is less than 8, in other words, to a case where a maximum serving cell index for an SCell with a MAC entity for which beam failure detection is configured is less than 8. When the number of SCells for which BFR is configured is 8 or more, a MAC CE structure shown in FIG. 8 may be applied. The MAC CE shown in FIG. 8 indicates a case where 8 or more SCells and one or more TRP fields corresponding to each SCell are included.

Second BFR MAC CE Structure

The MAC CE may include a TRP field corresponding to a cell (e.g., $C_i=1$) in which beam failure is detected (see FIG. 9). That is, the MAC CE may not include a TRP field corresponding to a cell (e.g., $C_i=0$) in which the beam failure has not been detected.

FIG. 9 shows a case where TRP fields $(T_i,0, T_i,1)$, $(T_j,0, T_j,1)$, and $(T_k,0, T_k,1)$ corresponding to some cells in which the beam failure is detected are configured.

Therefore, configuration of TRP fields can be flexibly controlled on the basis of the presence or absence of detection of beam failure in each cell. For example, one or more TRP fields (e.g., $T_i,1$ and $T_i,0$) may be configured for a cell being $C_i=1$, and TRP fields may not be configured for a cell being $C_i=0$.

When a plurality of (e.g., two) TRP fields are configured for the cell being $C_i=1$, the two TRP fields may be arranged in a certain sequence. For example, in the same octet, TRPs may be arranged in ascending order of index, from right to left. When a plurality of cells being $C_i=1$ exist, TRP fields corresponding to each cell may be configured in order of cell indices (e.g., so that a TRP field corresponding to a cell with a smaller index is arranged first).

When the number of cells with detected beam failure is low and TRP fields arranged in a certain octet are less than a certain number (e.g., 8), a reserved bit (e.g., R=0) may be configured (or the octet may be filled with R=0).

Any one of methods mentioned in the first BFR CE structure may be employed in a method for configuring the TRP field (e.g., configuration/interpretation of bit values) or in configuration (or the presence or absence of existence) of one or a plurality of octets including an AC field.

Third BFR MAC CE Structure

Figure 10:
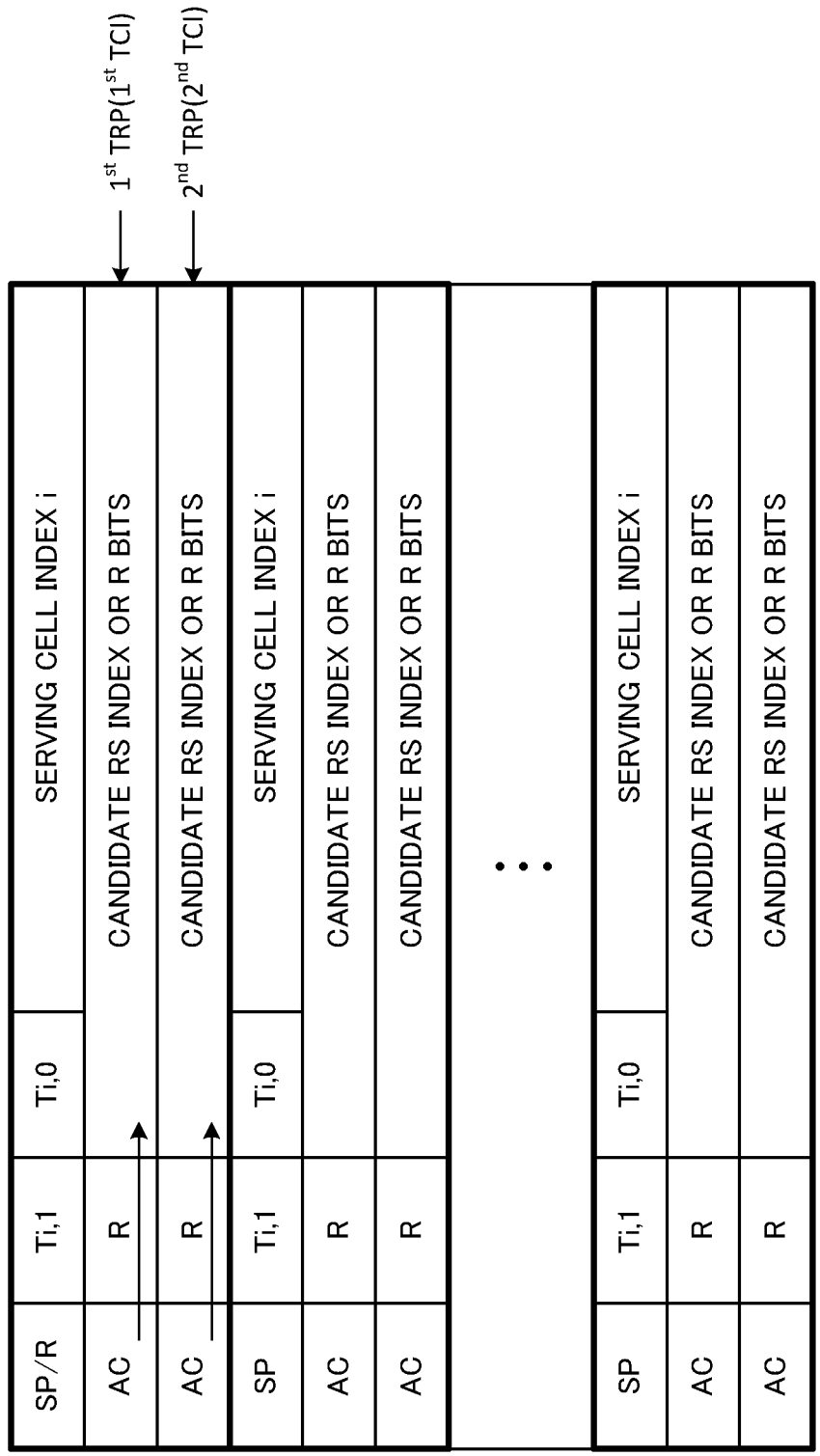
FIG. 10 is a diagram to show an example of a third MAC CE structure according to the fourth embodiment.

The MAC CE may include, as a cell field, a field in which a specific cell index is specified with use of bits (e.g., multiple bits) (e.g., see FIG. 10). That is, the MAC CE may include a cell field corresponding to a cell in which beam failure is detected, and may not include a cell field corresponding to a cell in which the beam failure has not been detected.

The cell in which beam failure is detected may be a cell in which beam failure is detected in at least one TRP of one or more TRPs corresponding to the cell. The UE notifies the MAC CE by including, in the MAC CE, the presence or absence of existence of an index of the cell in which beam failure is detected and a new candidate beam (new candidate RS index) for one or more TRPs corresponding to the cell and information related to the new candidate beam, if the new candidate beam exists.

For example, the UE notifies index i by using the cell field when detecting beam failure in cell #i. One or more TRP (here, two TRP (or TCI)) fields corresponding to cell i may be included in the MAC CE. Which of TRPs (or both TRPs) beam failure has occurred in may be notified by each TRP field value (e.g., bit value). Alternatively, whether multiple TRPs are configured for a serving cell may be notified by each TRP field value (e.g., bit value).

A TCI field may be configured for the same octet (first octet) as a cell field used for notification of an index of the serving cell. A new candidate RS field used for notification of a new candidate beam (or new candidate RS index) for each TRP may be configured for an octet (e.g., second octet) different from the first octet. When information related to new candidate beams for a plurality of TRPs is notified, information related to a new candidate beam for each TRP may be configured for a different octet.

With respect to a TRP in which beam failure is detected, an AC field to notify whether a new candidate RS index exists (or whether a reserved bit field (R field) exists) may be configured.

The AC field may be configured for an octet for which the new candidate RS field for each TRP is configured.

Assume a case where beam failure is detected in a cell for which BFR for multiple TRPs is not configured (e.g., a cell for which existing BFR is configured). In such a case, only one octet including the AC field (or new candidate RS field) may be configured for the cell (see FIG. 11).

Figure 11:
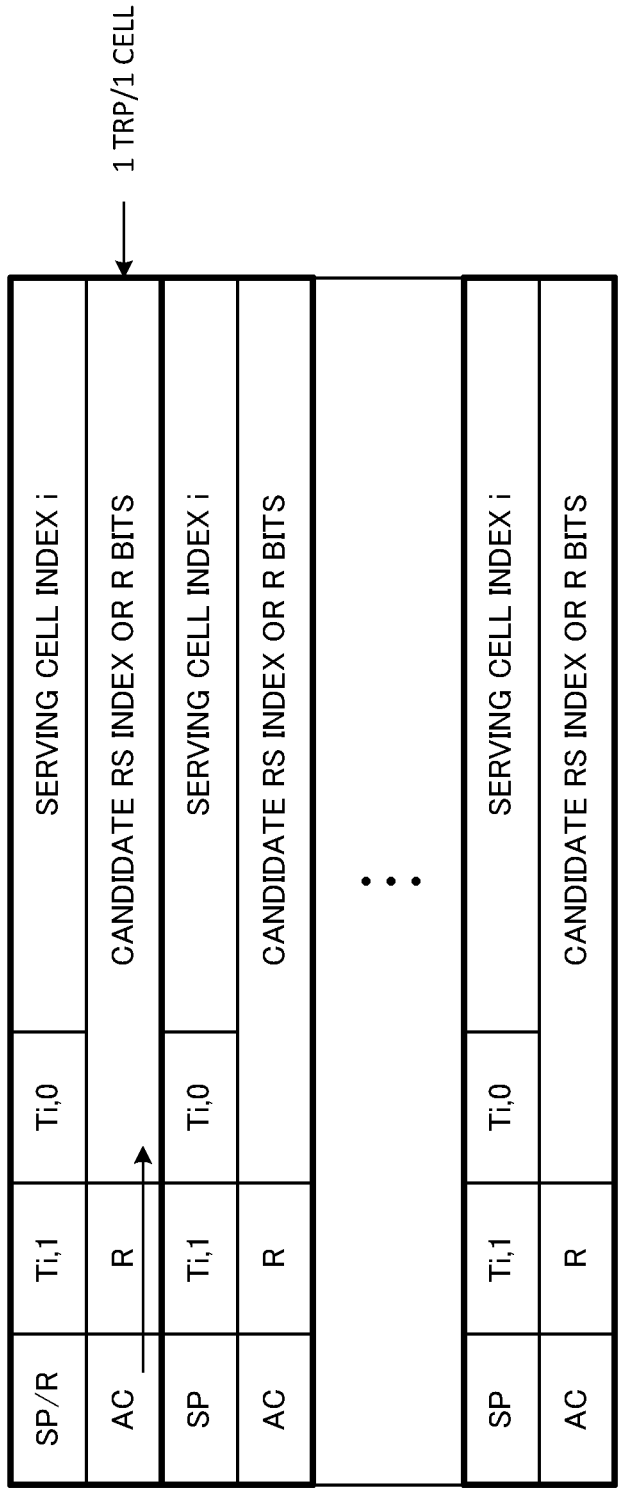
FIG. 11 is a diagram to show another example of the third MAC CE structure according to the fourth embodiment.

FIG. 11 shows a case where one octet including the new candidate RS field (or AC field) is configured for serving cell #i.

In a cell for which the BFR for multiple TRPs is configured, assume a case where beam failure is detected in only one TRP (e.g., a case where 1 is configured for one TRP field of two TRP fields). In such a case, only one octet including the AC field (or new candidate RS field) may be configured for the cell (see FIG. 11).

In the cell for which the BFR for multiple TRPs is configured, assume a case where beam failure is detected in two TRPs (e.g., a case where 1 is set to both TRP fields of two TRP fields). In such a case, only one octet (e.g., an octet corresponding to a new candidate RS field for a specific TRP) including the AC field (or new candidate RS field) may be configured for the cell (see FIG. 11).

When only one octet is configured, the specific TRP may be configured by higher layer signaling, may be determined on the basis of a certain rule (e.g., an index), or may be autonomously determined by the UE. When the UE autonomously selects the specific TRP, correspondence between new candidate RS indices and TRPs may be notified to the UE beforehand. In this case, the UE may assume that the base station can judge a corresponding TRP on the basis of a notified new candidate RS index.

For example, even when beam failure is detected in the two TRPs, it is only necessary that one new candidate RS index is reported to the base station from the UE. In an SpCell (PCell/SPCell), random access procedure for BFR can be performed with use of the one new candidate beam (or new candidate RS index).

In a secondary cell (SCell), reporting a new candidate RS index for at least one TRP to the base station from the UE can recover beam failure in the TRP. Beam information selected by normal beam management (e.g., beam measurement/report) may be indicated for another TRP with use of the recovered beam.

Alternatively, in the cell for which the BFR for multiple TRPs is configured, when beam failure is detected in two TRPs, two octets (octets each corresponding to each TRP) each including the AC field (or new candidate RS field) may be configured for the cell (see FIG. 10). Therefore, in a case where beam failure has occurred in the two TRPs, it is possible to notify respective new candidate RS indices for each TRP by using the MAC CE.

[Variation 1]

Figure 12:
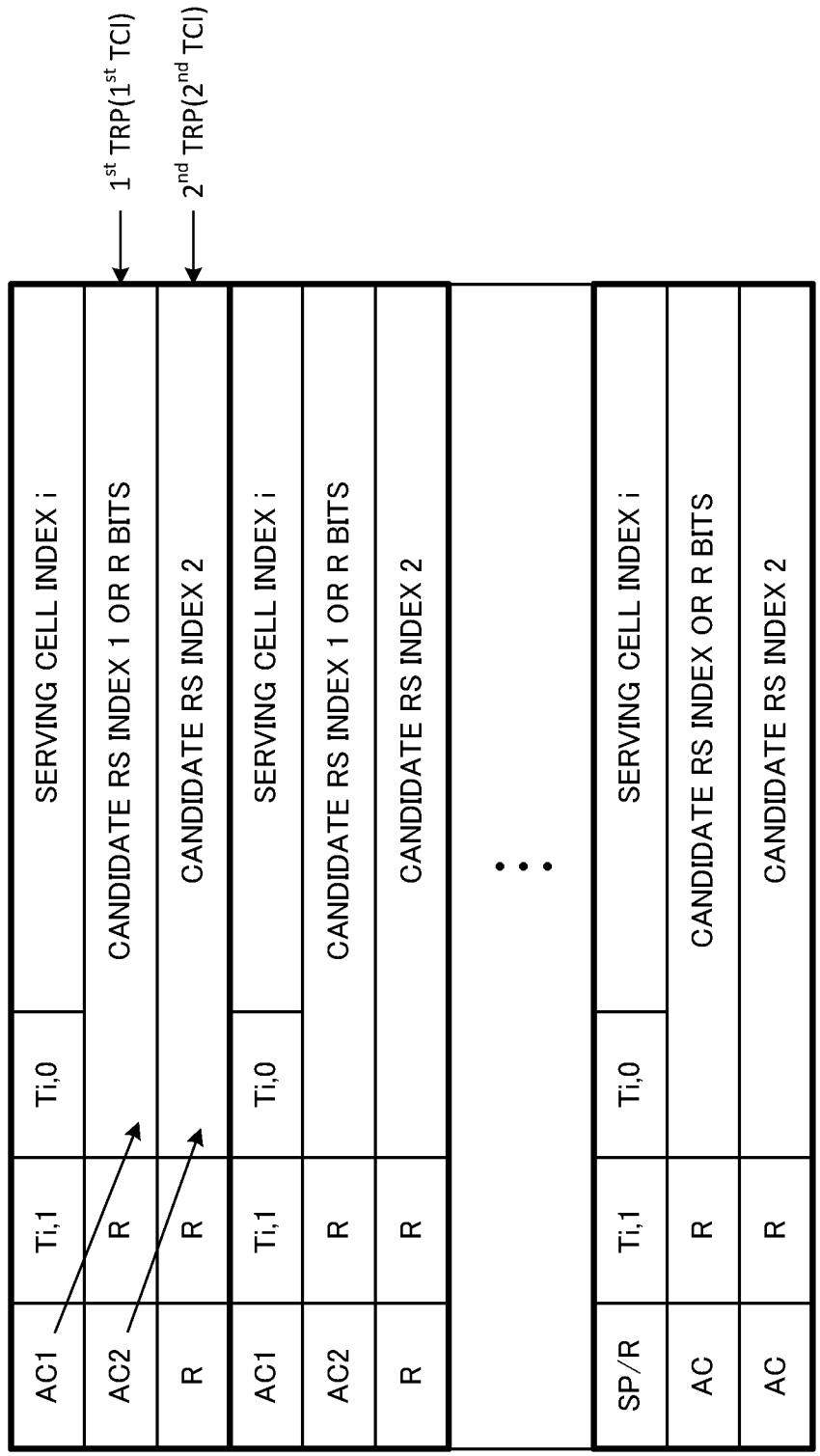
FIG. 12 is a diagram to show another example of the third MAC CE structure according to the fourth embodiment.

Note that the AC field may be configured for an octet different from that for the new candidate RS field (see FIG. 12). For example, whether a new candidate RS index is configured for the new candidate RS field in a certain octet (or whether a reserved bit (e.g., R bit) is configured) may be specified by the AC field in a different octet (last octet). Alternatively, the presence or absence of existence of another octet (octet for which the new candidate RS field is configured) may be specified with use of the AC field included in the certain octet.

FIG. 12 shows a case where a first AC (AC1) field is included in an octet including the cell field and a second AC (AC2) field is included in an octet including the new candidate RS field for the first TRP. The AC1 field may indicate whether information indicating the new candidate RS index is configured for new candidate RS field 1 (corresponding to TRP #0) or whether a reserved bit (e.g., R bit) is configured for new candidate RS field 1.

The AC2 field may indicate whether a next octet exists. When a new candidate RS for TRP #1 does not exist, a case that new candidate RS field 2 (corresponding to TRP #1) is not configured/does not exist may be notified by the AC2 field.

Assume a case where beam failure is detected in only one TRP of the two TRPs (a case where only either of two BFR fields is 1) or a case where beam failure is detected in a cell for which the BFR for multiple TRPs is not configured. In such a case, the AC1 field may indicate whether a next octet (octet including the new candidate RS field) exists. When a new candidate RS for a specific TRP or cell does not exist, a case that the new candidate RS field (corresponding to the specific TRP/cell) is not configured/does not exist may be notified by the AC1 field.

An octet including a new candidate RS field corresponding to another TRP may not be configured/may not exist. That is, whether at most one octet exists may be notified by AC1.

Thus, the presence or absence of existence of an octet including the new candidate RS field is notified by the AC field included in an octet different from the octet, and thus the number of octets can be reduced depending on communication conditions.

[Variation 2]

Variation 1 shows a case where a location of the AC field of FIG. 10 is changed, but the present disclosure is not limited to this. For example, a location of the AC field of FIG. 11 may be changed (see FIG. 13).

Figure 13:
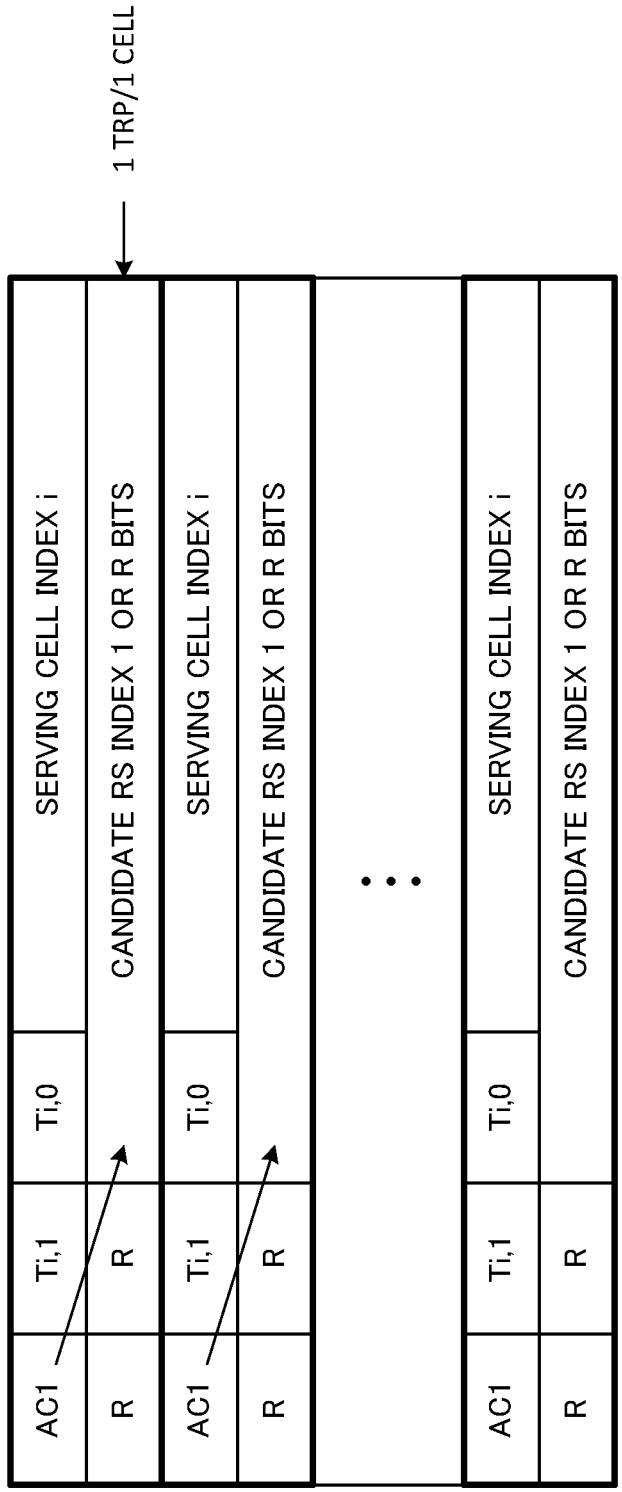
FIG. 13 is a diagram to show another example of the third MAC CE structure according to the fourth embodiment.

FIG. 13 shows a case where a first AC (AC1) field is included in an octet including the cell field. The AC1 field may indicate whether a next octet (e.g., an octet for which the new candidate RS field is configured) exists. When a new candidate RS for a certain TRP/cell does not exist, a case that the new candidate RS field is not configured/does not exist may be notified by the AC1 field. In only a case where the new candidate RS index exists for a TRP/cell in which beam failure is detected, existence of one octet may be notified by AC1.

Therefore, when the new candidate RS index for the TRP/cell in which beam failure is detected does not exist, the number of octets can be reduced.

Fourth BFR MAC CE Structure

Figure 14:
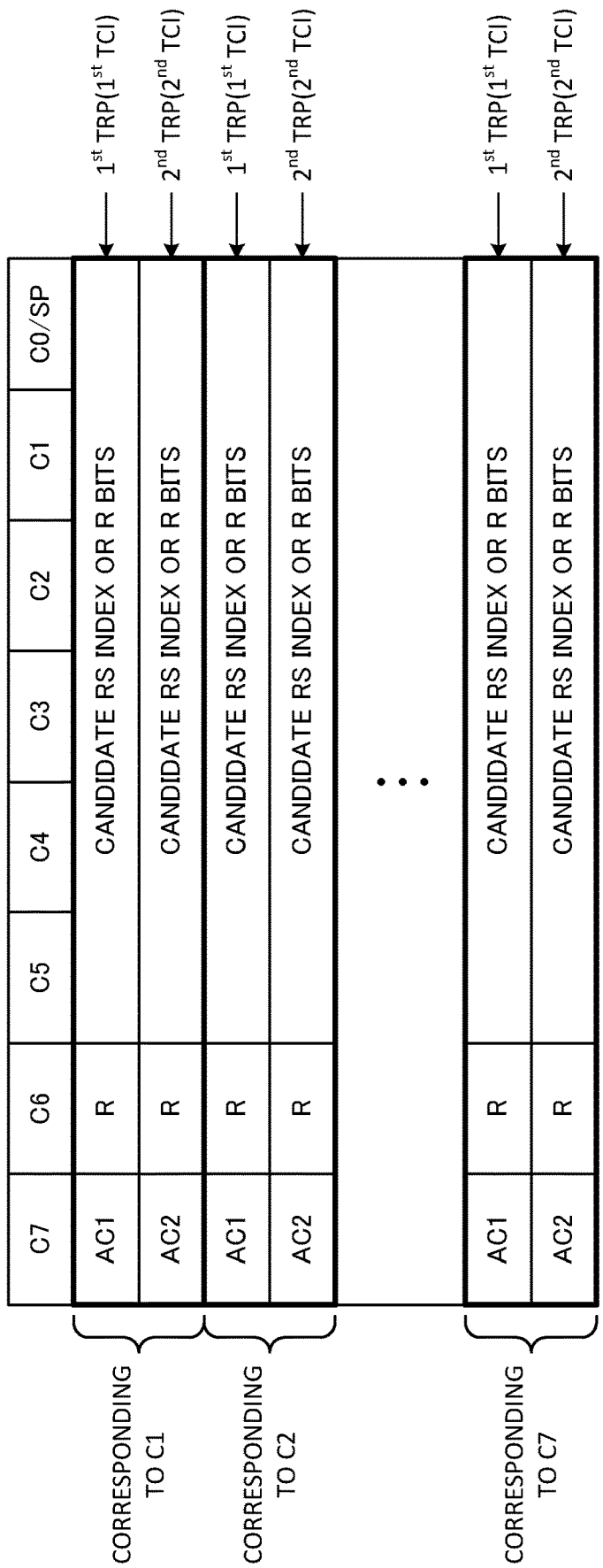
FIG. 14 is a diagram to show an example of a fourth MAC CE structure according to the fourth embodiment.

The MAC CE may not include TRP fields each corresponding to each cell (see FIG. 14). For example, a field for each cell (configured cell) and a field (new candidate RS field) to notify information related to new candidate beams (or new candidate RS indices) for TRPs each corresponding to each cell may be included in at least the MAC CE.

The AC field may also be included in the MAC CE. The AC field may be used for notification of whether the new candidate RS index is specified by the new candidate RS field corresponding to each TRP/certain cell (or whether the new candidate RS field becomes the reserved bit). Alternatively, the AC field may be used for notification of whether an octet for which the new candidate RS field is configured exists.

The MAC CE shown in FIG. 14 indicates a case where cell fields (here, 1 bit) corresponding to each cell and new candidate RS fields for TRPs corresponding to each cell are each configured.

FIG. 14 shows a case where new candidate RS fields for two respective TRPs are configured for each cell. The new candidate RS fields for each TRP may be configured for different octets, and the AC field may be configured for each octet. Note that FIG. 14 shows a case where fields (e.g., 1 bit) for each cell are each configured, but a structure to indicate, with multiple bits, the cell in which beam failure is detected may be employed.

FIG. 14 shows a case where new candidate RS fields for two respective TRPs are configured for different octets with respect to each cell (e.g., C1 to C7 corresponding to SCells). Note that the new candidate RS fields corresponding to each cell may not be always configured. For example, a new candidate RS field for a TRP corresponding to a cell (e.g., a cell with a cell field being 1) in which beam failure is detected may be configured.

When BFR for multiple TRPs is not configured for the cell in which beam failure is detected, a new candidate RS field (or octet including the new candidate RS field) corresponding to the cell may be one new candidate RS field.

When the BFR for multiple TRPs is configured for the cell in which beam failure is detected, new candidate RS fields (or octets including the new candidate RS fields) corresponding to the cell may be at least one new candidate RS field (or may be always two new candidate RS fields). In this case, whether new candidate RS indices for TRPs corresponding to the octets exist may be specified by AC fields included in each octet. FIG. 14 shows a case where AC1 is used for notification of whether a new candidate RS index for the first TRP in the certain cell exists and AC2 is used for notification of whether a new candidate RS index for the second TRP in the certain cell exists.

FIG. 14 shows a structure in which the AC field is included in each of the octets including the new candidate RS fields for each TRP, but the present disclosure is not limited to this. For example, a plurality of AC fields each corresponding to each octet may be included in one of a plurality of (e.g., two) octets each corresponding to a plurality of (e.g., two) TRPs corresponding to a certain cell (see FIG. 15).

Figure 15:
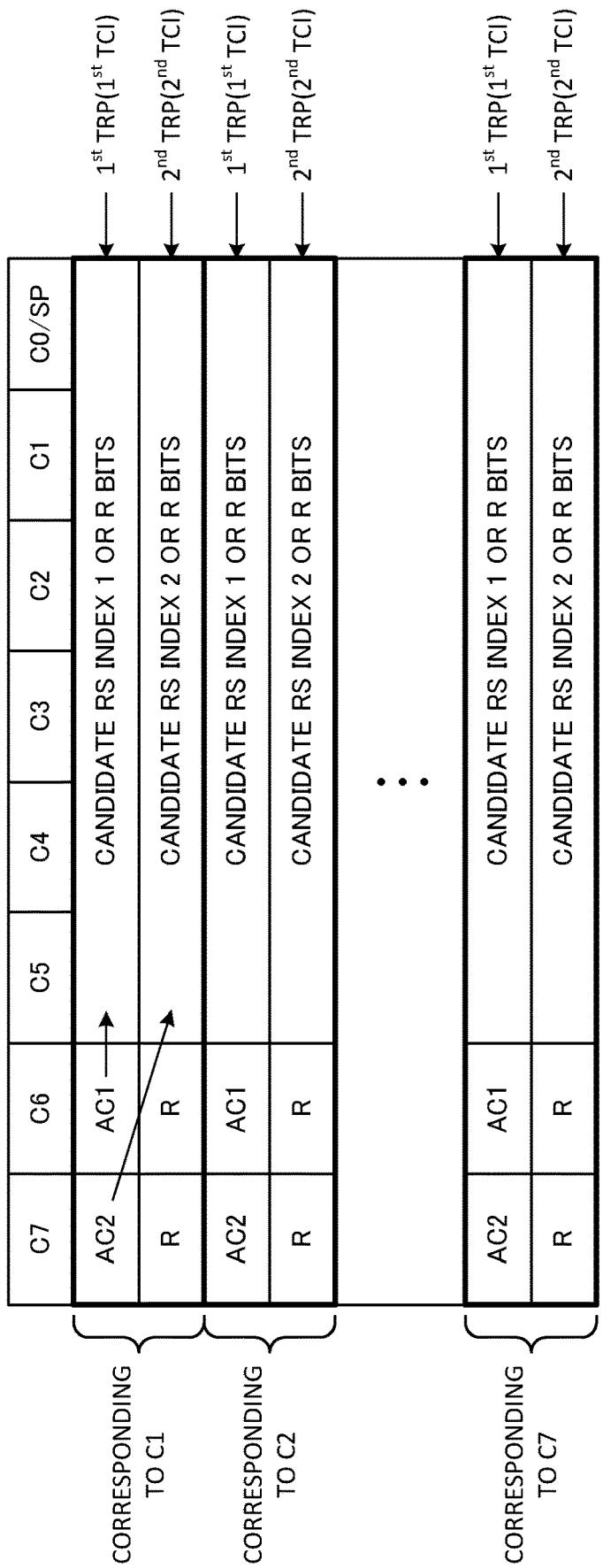
FIG. 15 is a diagram to show another example of the fourth MAC CE structure according to the fourth embodiment.

FIG. 15 shows a case where a first octet including new candidate RS field #1 for the first TRP and a second octet including new candidate RS field #2 for the second TRP are configured for cell Ci and a first AC1 field and a second AC2 field are included in the first octet. The first AC1 field may be used for notification of whether the new candidate RS index is included in new candidate RS field #1, and the second AC2 field may be used for notification of whether the new candidate RS index is included in new candidate RS field #2.

Octets for new candidate RS fields for the cell may be configured for only a cell in which beam failure is detected (e.g., a cell for which the cell field is set to 1). When beam failure is detected in a cell for which the BFR for multiple TRPs is configured, at least one octet (e.g., octets including a plurality of AC fields) may be configured for the cell. Whether the second octet is configured/exists may be notified by the AC2 field included in the first octet.

When beam failure is detected in a cell for which the BFR for multiple TRPs is not configured, only one octet may be configured for the cell.

FIG. 15 shows a case where a plurality of (e.g., two) octets (or new candidate RS fields for TRPs) are configured for the cell, but the present disclosure is not limited to this. One octet may be configured for each cell (see FIG. 16).

Figure 16:
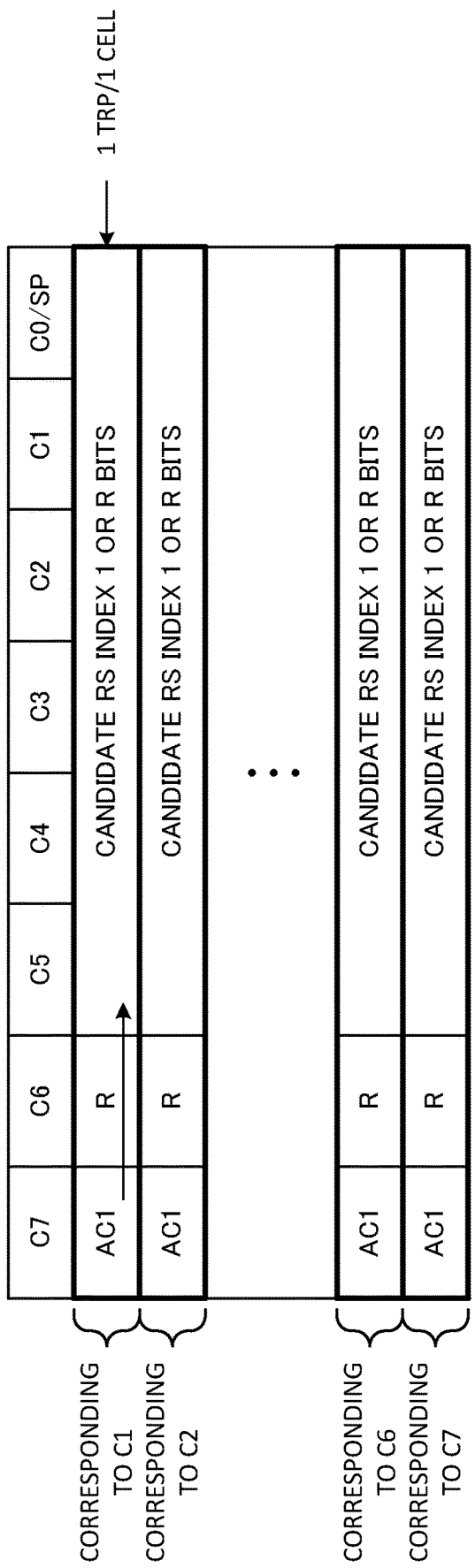
FIG. 16 is a diagram to show another example of the fourth MAC CE structure according to the fourth embodiment.

In FIG. 16, even when beam failure is detected in a plurality of (e.g., two) TRPs corresponding to a cell, one octet (or new candidate RS field for one TRP) may be configured for the cell. A TRP to which the new candidate RS index is notified may be selected on the basis of a certain rule. Octets (or new candidate RS fields for TRPs) for each cell may be configured/exist for only a cell in which beam failure is detected (e.g., a cell for which the cell field is set to 1).

The above-described description shows a case where the AC field indicating whether the new candidate RS index is configured (or whether the new candidate beam exists in TRPs) is configured in the new candidate RS fields for each TRP, but the present disclosure is not limited to this. Some AC fields may not be configured (see FIG. 17).

Figure 17:
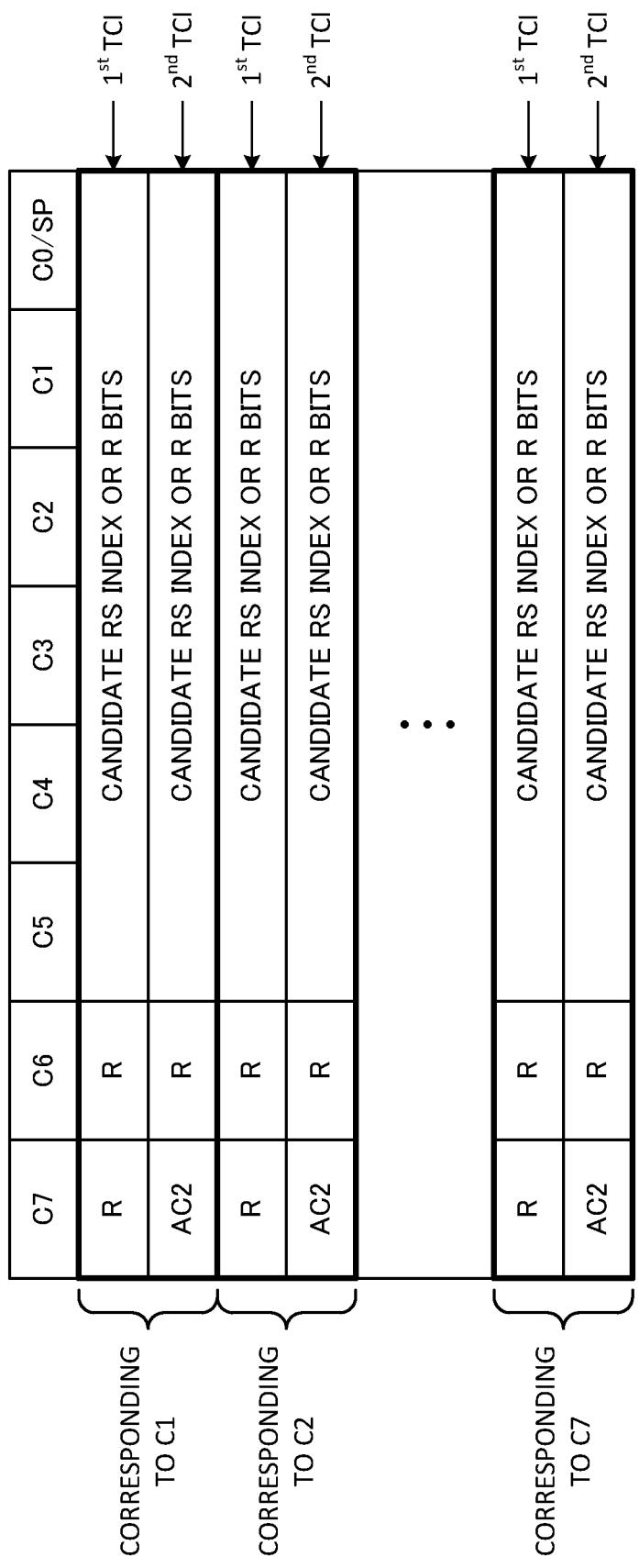
FIG. 17 is a diagram to show another example of the fourth MAC CE structure according to the fourth embodiment.

FIG. 17 shows a case where the AC1 field is not configured (e.g., the AC1 field becomes the reserved bit). FIG. 17 shows a case where a new candidate RS field for which the AC field is not configured corresponds to a first TCI and a new candidate RS field for which the AC field (here, AC2 field) is configured corresponds to a second TCI. In this case, AC1 may not be notified, and AC2 may be used for notification of whether the new candidate RS index for the second TRP exists. Note that the first TCI may correspond to the first TRP or the second TRP.

Note that in any structure mentioned above, the AC field may be replaced with a reserved bit (R) field. In this case, the R field may be used for notification of the presence or absence of existence of the new candidate RS index/the presence or absence of existence of another octet.

(UE Operation after Response Signal Reception from Base Station)

Fifth Embodiment

In a fifth embodiment, a UE operation after reception of a response signal from a base station to a beam recovery request (e.g., MAC CE transmission including information related to a new candidate RS) for one or a plurality of TRPs will be described.

In existing systems, a UE may receive a DL signal (or response signal) transmitted from a network (e.g., the base station) after transmitting a MAC CE including information related to a cell in which beam failure is detected/information related to a TRP in which beam failure is detected/information related to a new candidate RS index for a cell or TRP. The DL signal may be DCI/PDCCH to schedule PUSCH transmission (e.g., a PDCCH comprising a certain DCI format). The PUSCH transmission may have the same HARQ process number as that of the first PUSCH (e.g., a PUSCH used for transmission of the MAC CE) and may have a toggled NDI field value.

The UE may update QCL (or beam) for a PDCCH/PUCCH/PDSCH/PUSCH after a certain period (e.g., 28 symbols) from reception of the DL signal. That is, QCL for the PDCCH/PUCCH/PDSCH/PUSCH may be updated along with a new beam configuration.

The UE may control a UE operation (e.g., beam assumption/TCI assumption/TPC assumption) for UL transmission/DL transmission after reception of the DL signal on the basis of information related to a new candidate beam transmitted by the MAC CE. For example, the UE may apply at least one of UE operations below.

The UE may, after a certain period from PDCCH reception, perform PDCCH monitoring in all CORESETs for an SCell specified by the MAC CE by using the same antenna port quasi co-location parameters as those associated with a certain index (e.g., qnew) corresponding to a reported new candidate RS index (UE operation 1).

When a certain condition is satisfied, the UE may transmit a PUCCH in a PUCCH-SCell by using the same spatial domain filter as that corresponding to a certain index (e.g., qnew) (UE operation 2). Transmit power used for PUCCH transmission may be determined on the basis of a certain index (e.g., qnew) (UE operation 3). qnew may correspond to an index for a received certain RS (e.g., a periodic CSI-RS or SS/PBCH block).

The certain condition may be at least one of a case that a certain higher layer parameter (e.g., PUCCH-SpatialRelationInfo) is configured for the PUCCH, a case that the PUCCH comprising an LRR (link recovery request) has not been transmitted or has been transmitted in an SpCell, and a case that the PUCCH is included in an SCell notified by the MAC-CE.

On the other hand, in Rel. 17 (or later versions), it is assumed that the UE performs transmission by including information related to a cell in which beam failure is detected/information related to a TRP in which beam failure is detected/information related to a new candidate RS index for a cell or TRP in the MAC CE. In such a case, how to control the UE operation after reception of the DL signal (or response signal) transmitted from the network (e.g., the base station) for the MAC CE becomes an issue.

An example of the UE operation after reception of the response signal from the base station will be described below. Note that description below describes using case 1 to case 4 shown in FIG. 4 as an example, but applicable cases are not limited to this.

Case 1

Figure 18:
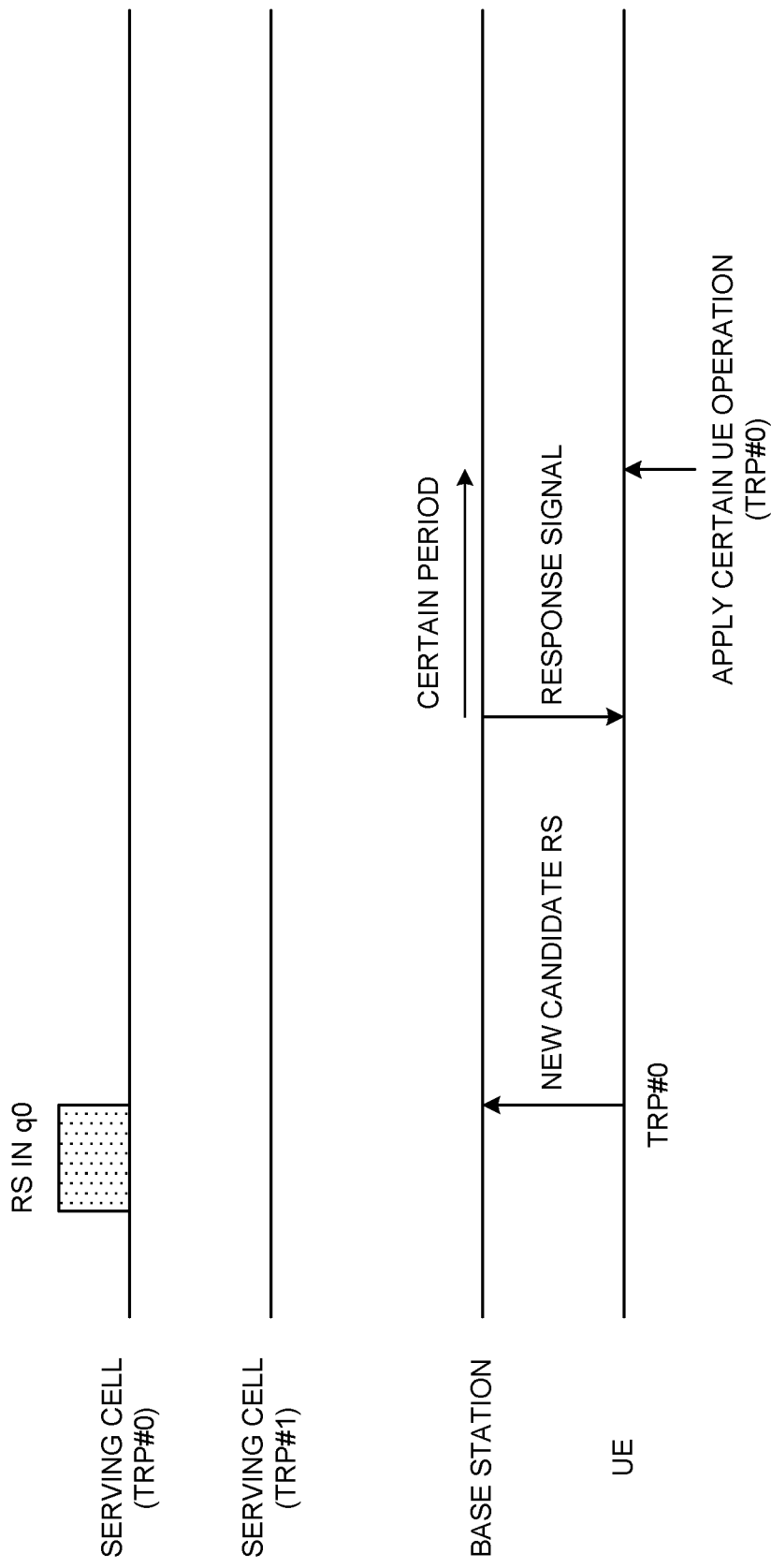
FIG. 18 is a diagram to show an example of BFR procedure according to a fifth embodiment.

Assume a case where the UE detects beam failure in only one TRP of a plurality of (e.g., two) TRPs with respect to an SpCell (PCell/PSCell) for which BFR for multiple TRPs is configured, and transmits a BFR MAC CE (see FIG. 18).

FIG. 18 shows a case where the UE detects beam failure in TRP #0 and transmits information related to a new candidate RS index corresponding to this TRP #0 by using the MAC CE.

The base station transmits the response signal (or DL signal) to the MAC CE transmitted from the UE. The DL signal may be DCI/PDCCH to schedule PUSCH transmission (e.g., a PDCCH comprising a certain DCI format). The PUSCH transmission may have the same HARQ process number as that of the first PUSCH (e.g., a PUSCH used for transmission of the MAC CE) and may have a toggled NDI field value.

When receiving the DL signal transmitted from the base station, the UE may, after a certain period (e.g., 28 symbols), apply a certain UE operation to the TRP in which beam failure is detected. On the other hand, the UE may not apply the certain UE operation to the TRP in which beam failure has not been detected. The certain UE operation may be at least one of the above-mentioned UE operation 1 to UE operation 3.

The TRP in which beam failure is detected may be interpreted as a TRP that has notified information related to the new candidate RS index by using the MAC CE. The TRP in which beam failure has not been detected may be interpreted as a TRP that has not notified the information related to the new candidate RS index by using the MAC CE.

For example, the UE may, after reception of the DL signal, apply the certain UE operation to a PDCCH/PUCCH associated with the same index (e.g., control resource pool index (CORESETPoolindex)) as that of the TRP (or BFD RS set) in which beam failure is detected. That is, the UE may control so as to change (or update) a TCI state/spatial relation corresponding to the TRP in which beam failure is detected.

On the other hand, the UE may control so as not to change (or update) a TCI state/spatial relation corresponding to another TRP in which beam failure has not been detected.

Therefore, when detection of beam failure is independently performed for each TRP, beams (TCI states/spatial relations) used for UL transmission/DL reception in the TRP in which beam failure is detected can be selectively updated. As a result, it is possible to appropriately perform BFR procedure in units of TRPs.

Note that in case 1, the UE may transmit the MAC CE by including information related to a plurality of new candidate RS indices each corresponding to the plurality of (e.g., two) the TRPs in the MAC CE. In this case, TCI states/spatial relations each corresponding to the plurality of the TRPs may each be updated.

Case 2

Assume a case where the UE detects beam failure in only one TRP of a plurality of (e.g., two) TRPs with respect to an SCell for which BFR for multiple TRPs is configured, and transmits a BFR MAC CE.

The base station transmits the response signal (or DL signal) to the MAC CE transmitted from the UE. The DL signal may be DCI/PDCCH to schedule PUSCH transmission (e.g., a PDCCH comprising a certain DCI format). The PUSCH transmission may have the same HARQ process number as that of the first PUSCH (e.g., a PUSCH used for transmission of the MAC CE) and may have a toggled NDI field value.

When receiving the DL signal transmitted from the base station, the UE may, after a certain period (e.g., 28 symbols), apply a certain UE operation to the TRP in which beam failure is detected in a certain SCell. On the other hand, the UE may not apply the certain UE operation to the TRP in which beam failure has not been detected in the certain SCell. The certain UE operation may be at least one of the above-mentioned UE operation 1 to UE operation 3.

The TRP in which beam failure is detected in the certain SCell may be interpreted as a TRP that has notified information related to the new candidate RS index by using the MAC CE. The TRP in which beam failure has not been detected may be interpreted as a TRP that has not notified the information related to the new candidate RS index by using the MAC CE.

For example, the UE may, after reception of the DL signal, apply the certain UE operation to a PDCCH/PUCCH associated with the same index (e.g., control resource pool index (CORESETPoolindex)) as that of the TRP (or BFD RS set) in which beam failure is detected in the certain SCell. That is, the UE may control so as to change (or update) a TCI state/spatial relation corresponding to the TRP in which beam failure is detected.

On the other hand, the UE may control so as not to change (or update) a TCI state/spatial relation corresponding to another TRP in which beam failure has not been detected in an SCell.

Therefore, when detection of beam failure is independently performed for each TRP, beams (TCI states/spatial relations) used for UL transmission/DL reception in the TRP in which beam failure is detected can be selectively updated. As a result, it is possible to appropriately perform BFR procedure in units of TRPs.

Note that in case 2, the UE may transmit the MAC CE by including information related to a plurality of new candidate RS indices each corresponding to the plurality of (e.g., two)

the TRPs in the MAC CE. In this case, TCI states/spatial relations each corresponding to the plurality of the TRPs may each be updated.

Case 3

Figure 19:
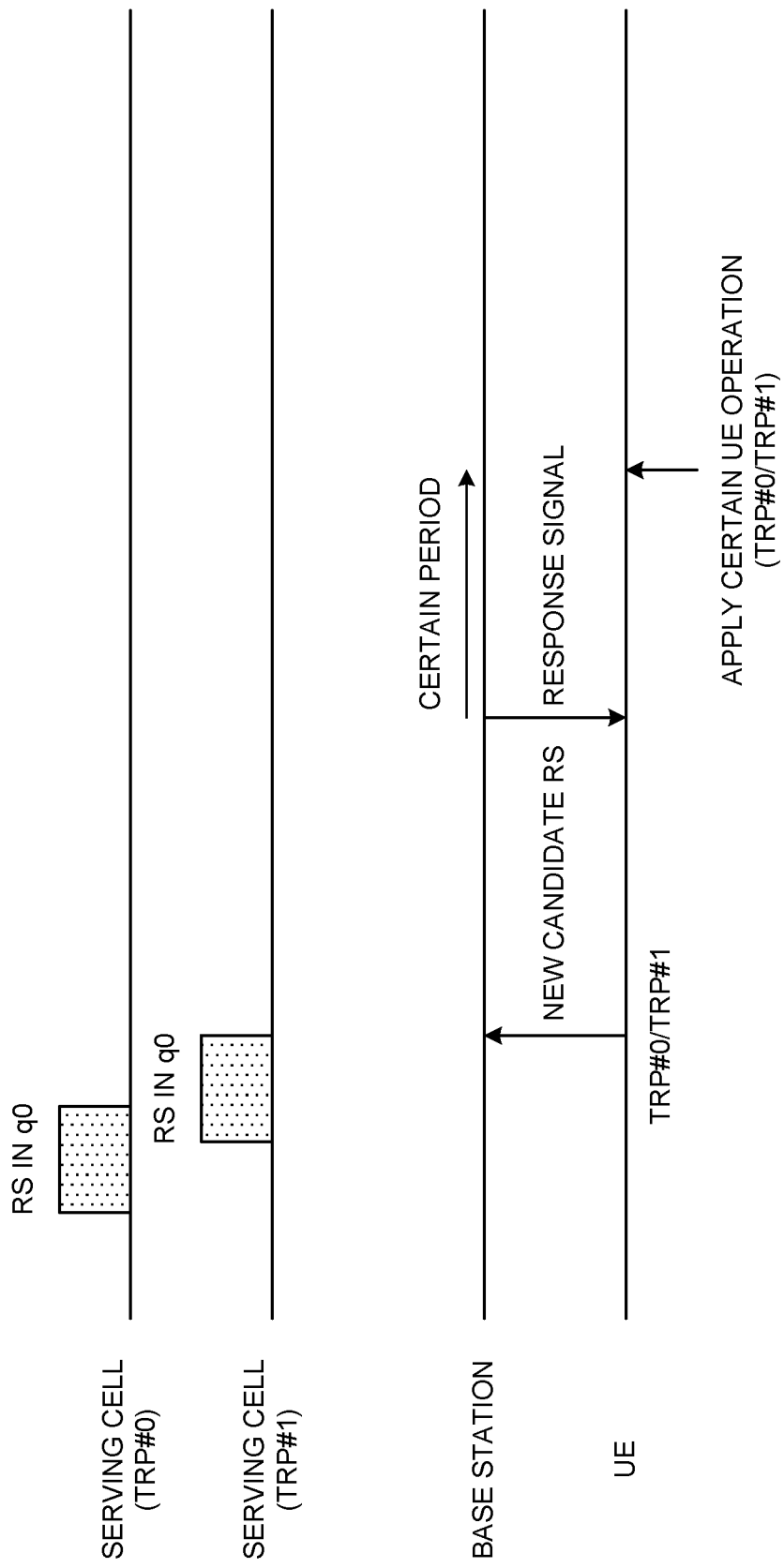
FIG. 19 is a diagram to show another example of the BFR procedure according to the fifth embodiment.

Assume a case where the UE detects beam failure in each of a plurality of (e.g., two) TRPs with respect to an SCell for which BFR for multiple TRPs is configured, and transmits a BFR MAC CE (see FIG. 19).

FIG. 19 shows a case where the UE detects beam failure in each of TRP #0 and TRP #1 and transmits either or both of information related to a new candidate RS index corresponding to TRP #0 and information related to a new candidate RS index corresponding to TRP #1 by using the MAC CE.

For example, the UE may transmit only one new candidate RS index (e.g., new candidate RS index corresponding to one TRP) by using a BFR MAC CE (case 3-1).

Alternatively, the UE may transmit a plurality of new candidate RS indices (e.g., a plurality of new candidate RS indices each corresponding to two TRPs) by using the BFR MAC CE (case 3-2). When transmitting both of the information related to a new candidate RS index corresponding to TRP #0 and the information related to a new candidate RS index corresponding to TRP #1, the information may be separately notified, or may be notified with use of one notification. Response signals from the base station may also be separately notified, or may be notified with use of one notification.

The base station transmits the response signal (or DL signal) to the MAC CE transmitted from the UE. The DL signal may be DCI/PDCCH to schedule PUSCH transmission (e.g., a PDCCH comprising a certain DCI format). The PUSCH transmission may have the same HARQ process number as that of the first PUSCH (e.g., a PUSCH used for transmission of the MAC CE) and may have a toggled NDI field value.

When one new candidate beam is notified by the MAC CE (case 3-1), the UE may control the UE operation on the basis of at least one of the following option 5-1 to option 5-3.

Option 5-1

When receiving the DL signal transmitted from the base station, the UE may, after the certain period, apply the certain UE operation (or qnew) to a serving cell without considering TRP information. For example, the UE may apply the same UE operation as that of Rel. 16 (or earlier versions) on the basis of a new candidate RS index notified by the MAC CE.

That is, when detecting beam failure in a plurality of TRPs in a certain cell and reporting information related to one new candidate RS index, the UE may control so as to change (or update) a TCI state/spatial relation corresponding to the serving cell, instead of for each TRP.

Option 5-2

When receiving the DL signal transmitted from the base station, the UE may apply the certain UE operation to only a specific TRP of TRPs in which beam failure is detected in the serving cell. The specific TRP may be determined on the basis of a certain rule.

For example, the UE may apply the certain UE operation (or qnew) to a PDCCH/PUCCH associated with a TRP with the lowest index (or CORESET pool index=0). That is, the UE may control so as to change (or update) a TCI state/spatial relation corresponding to the specific TRP of the plurality of the TRPs in which beam failure is detected.

On the other hand, the UE may control so as not to change (or update) a TCI state/spatial relation corresponding to another TRP other than the specific TRP.

Option 5-3

When receiving the DL signal transmitted from the base station, the UE may apply the certain UE operation to only a TRP for which information related to a new candidate beam is transmitted with use of the MAC CE out of TRPs in which beam failure is detected in the serving cell. A specific TRP included in the MAC CE may be determined on the basis of a certain rule.

The UE may, after reception of the DL signal, control so that a TCI state/spatial relation corresponding to a TRP index (e.g., a control resource pool index (CORESET-Poolindex)) for which information related to a new candidate RS index is transmitted with use of the MAC CE is updated to a certain value (e.g., qnew).

On the other hand, the UE may control so as not to update a TCI state/spatial relation corresponding to another TRP for which the information related to a new candidate RS index is not transmitted with use of the MAC CE.

When a plurality of (e.g., two) new candidate beams are notified by the MAC CE (case 3-2), the UE may control the UE operation on the basis of the following option 5-4.

Option 5-4

When receiving the DL signal transmitted from the base station, the UE may apply the certain UE operation to each of a plurality of TRPs #0 and #1 in which beam failure is detected in the serving cell (or a plurality of TRPs #0 and #1 for which new candidate beam information is transmitted) (see FIG. 19).

For example, the UE may apply the certain UE operation (or qnew) to PDCCHs/PUCCHs each associated with each TRP index (or corresponding CORESET pool index). That is, the UE may control so as to change (or update) a TCI state/spatial relation corresponding to the plurality of the TRPs in which beam failure is detected.

Case 4

Assume a case where random access (e.g., a PRACH) is triggered for BFR in an SpCell (PCell/PSCell).

In the SpCell for which BFR for multiple TRPs is configured, a case where the UE triggers BFR in response to detection of beam failure in one TRP, and detects beam failure in another TRP before the UE receives the response signal (or DL signal) from the base station is conceivable. In such a case, the UE may start (or initialize) random access procedure for the BFR. The UE may also cancel BFR procedure using the MAC CE.

Therefore, it is possible to flexibly control the BFR procedure depending on communication environment.

The fifth embodiment may be employed in a terminal comprising a certain UE capability or in a terminal for which a certain higher layer parameter is configured. The UE operation after reception of the response signal from the base station may differ on the basis of an RNTI applied to CRC scrambling for a response signal (e.g., a PDCCH). The UE may employ the fifth embodiment when detecting the PDCCH to which a certain RNTI (e.g., a BFR-RNTI) is applied.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 20:
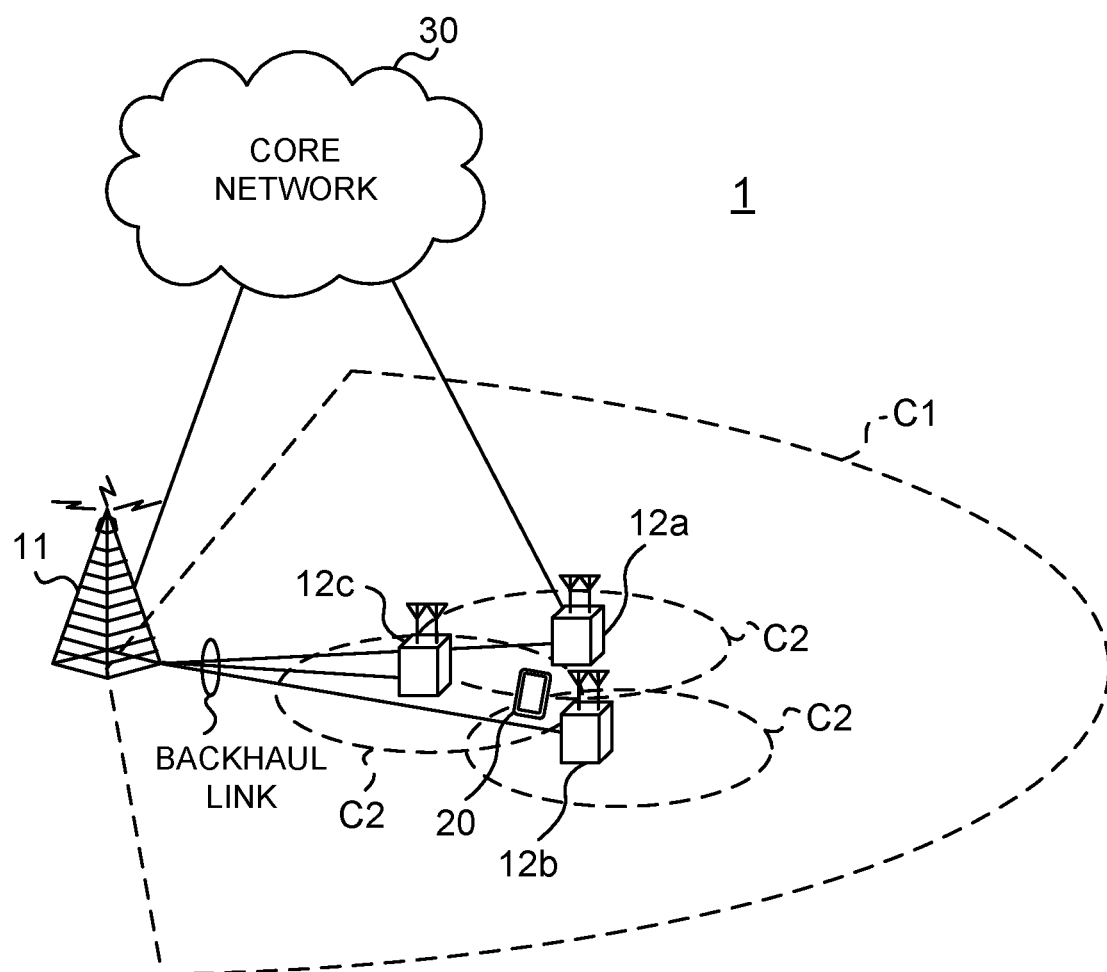
FIG. 20 is a diagram to show an example of a schematic structure of a radio communication system according to one embodiment.

FIG. 20 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 21:
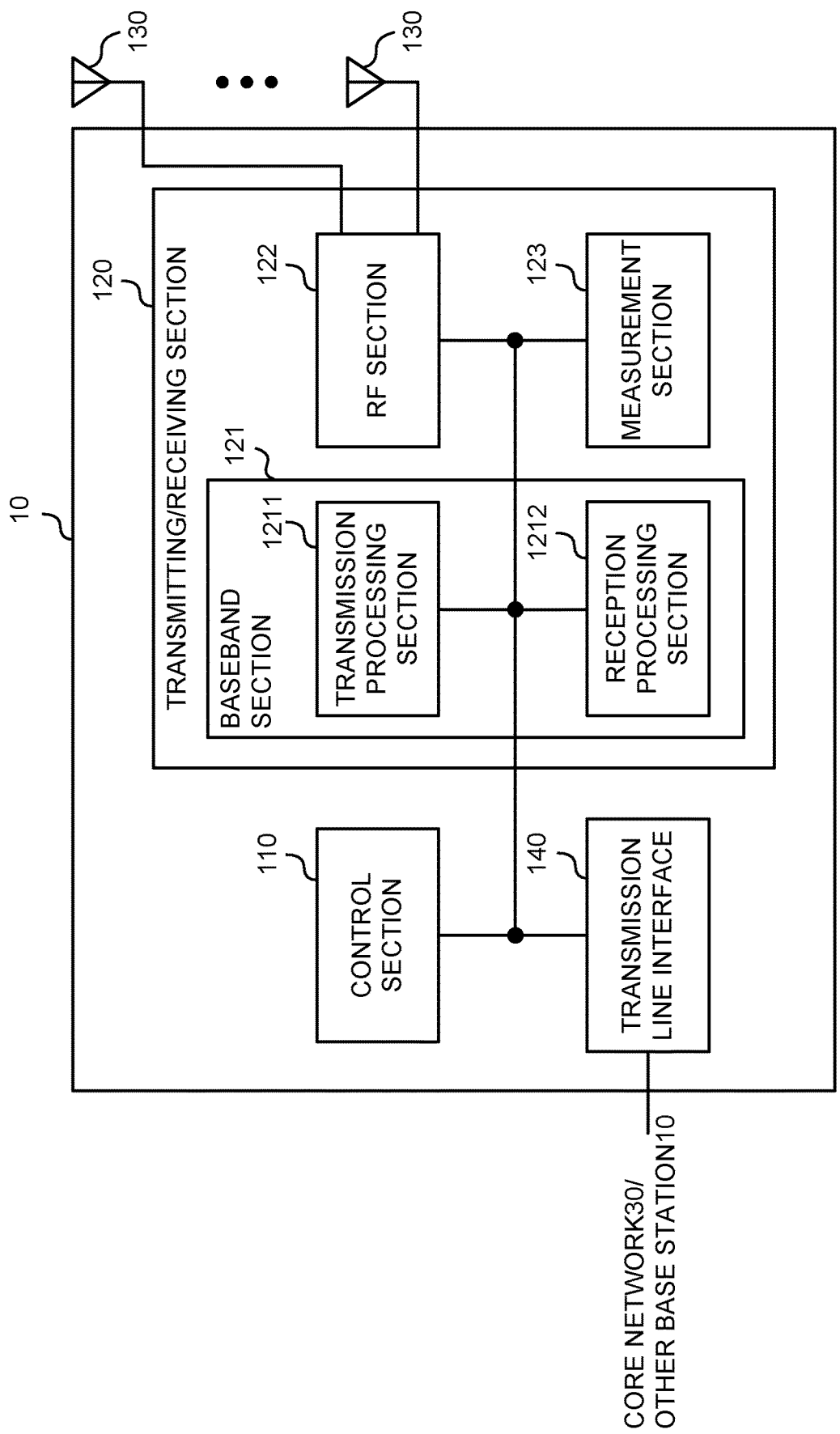
FIG. 21 is a diagram to show an example of a structure of a base station according to one embodiment.

FIG. 21 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal.

For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit, to a terminal, one or more beam failure detection reference signals (BFD-RSs) corresponding to a plurality of transmission/reception points.

The transmitting/receiving section 120 may, when beam failure in one or more transmission/reception points is detected in the terminal, receive a media access control control element (MAC CE) including information related to a transmission/reception point in which the beam failure is detected and a serving cell corresponding to the transmission/reception point in which the beam failure is detected.

The transmitting/receiving section 120 may receive information related to beam failure detected for each of plurality of transmission/reception points by using the media access control control element (MAC CE). The transmitting/receiving section 120 may transmit a DL signal corresponding to the information related to the beam failure.

The control section 110 may, when radio link quality of at least part of BFD-RSs is less than a threshold value in the terminal, control beam failure recovery procedure in units of one transmission/reception point or in units of a transmission/reception point set including a plurality of transmission/reception points.

The control section 110 may control recovery procedure for the beam failure for each of plurality of transmission/reception points.

The control section 110 may, after transmission of the DL signal, control at least one of an update on a condition applied to UL transmission and an update on a condition applied to DL reception for each transmission/reception point.

User Terminal

Figure 22:
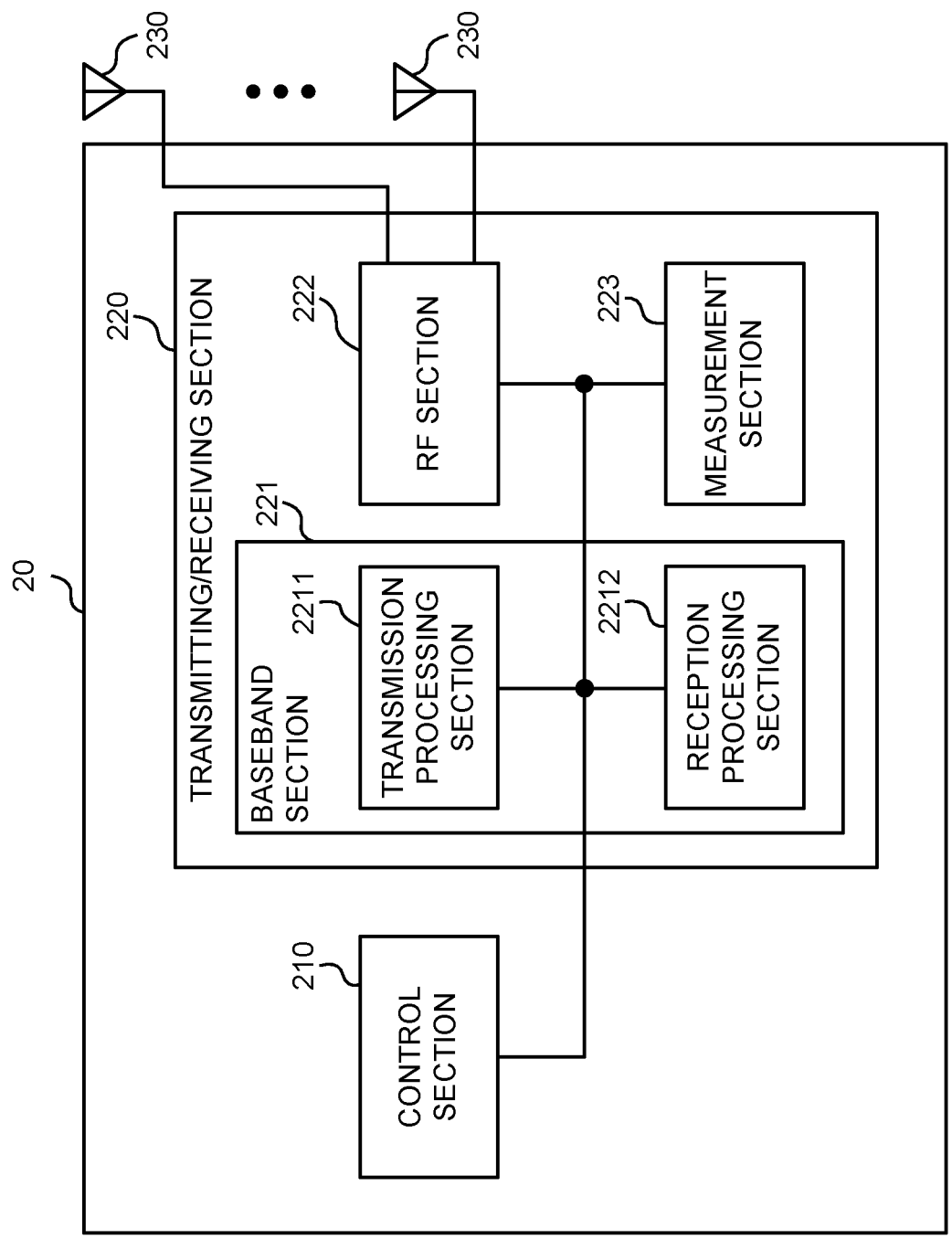
FIG. 22 is a diagram to show an example of a structure of a user terminal according to one embodiment.

FIG. 22 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive one or more beam failure detection reference signals (BFD-RSs) corresponding to a plurality of transmission/reception points.

The control section 210 may, when radio link quality of at least part of configured BFD-RSs is less than a threshold value, control beam failure recovery procedure in units of one transmission/reception point or in units of a transmission/reception point set including a plurality of transmission/reception points. The control section 210 may, when radio link quality of at least part of configured BFD-RSs is less than a threshold value, notify information related to a candidate BFD-RS corresponding to one transmission/reception point or information related to candidate BFD-RSs corresponding to a plurality of transmission/reception points.

The control section 210 may control notification of information related to beam failure detection to a higher layer from a lower layer, and at least one of a counter counted on the basis of the notification of information related to beam failure detection and a timer started on the basis of the notification of information related to beam failure detection may be configured in units of transmission/reception points or in units of a transmission/reception point set. The control section 210 may perform notification of beam failure recovery by using a scheduling request configured in units of one transmission/reception point or a scheduling request configured in units of a transmission/reception point set including a plurality of transmission/reception points.

The transmitting/receiving section 220 may, when beam failure in one or more transmission/reception points is detected, transmit a media access control control element (MAC CE) including information related to a transmission/reception point in which the beam failure is detected and a serving cell corresponding to the transmission/reception point in which the beam failure is detected.

The control section 210 may perform detection of beam failure for each of plurality of transmission/reception points. The MAC CE may include a field for the serving cell and a field for one or more transmission/reception points corresponding to the serving cell. The MAC CE may not include a field for a transmission/reception point corresponding to a serving cell in which beam failure is not detected. The MAC CE may include a field to specify an index of a serving cell in which beam failure is detected by using multiple bits.

The transmitting/receiving section 220 may transmit information related to beam failure detected for each of plurality of transmission/reception points by using a media access control control element (MAC CE).

The control section 210 may, when a DL signal corresponding to information related to beam failure is received, control at least one of an update on a condition applied to UL transmission and an update on a condition applied to DL reception for each transmission/reception point. The control section 210 may, when beam failure is detected in one transmission/reception point of a plurality of transmission/reception points corresponding to a certain cell and information related to the beam failure in the one transmission/reception point is transmitted with use of the MAC CE, update, on the basis of reception of the DL signal, at least one of a condition applied to UL transmission and a condition applied to DL reception in the one transmission/reception point.

The control section 210 may, when beam failure is detected in a plurality of transmission/reception points corresponding to a certain cell and information related to beam failure in one transmission/reception point of the plurality of the transmission/reception points is transmitted with use of the MAC CE, update, on the basis of reception of the DL signal, at least one of a condition applied to UL transmission and a condition applied to DL reception in the one transmission/reception point or a specific transmission/reception point.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 23:
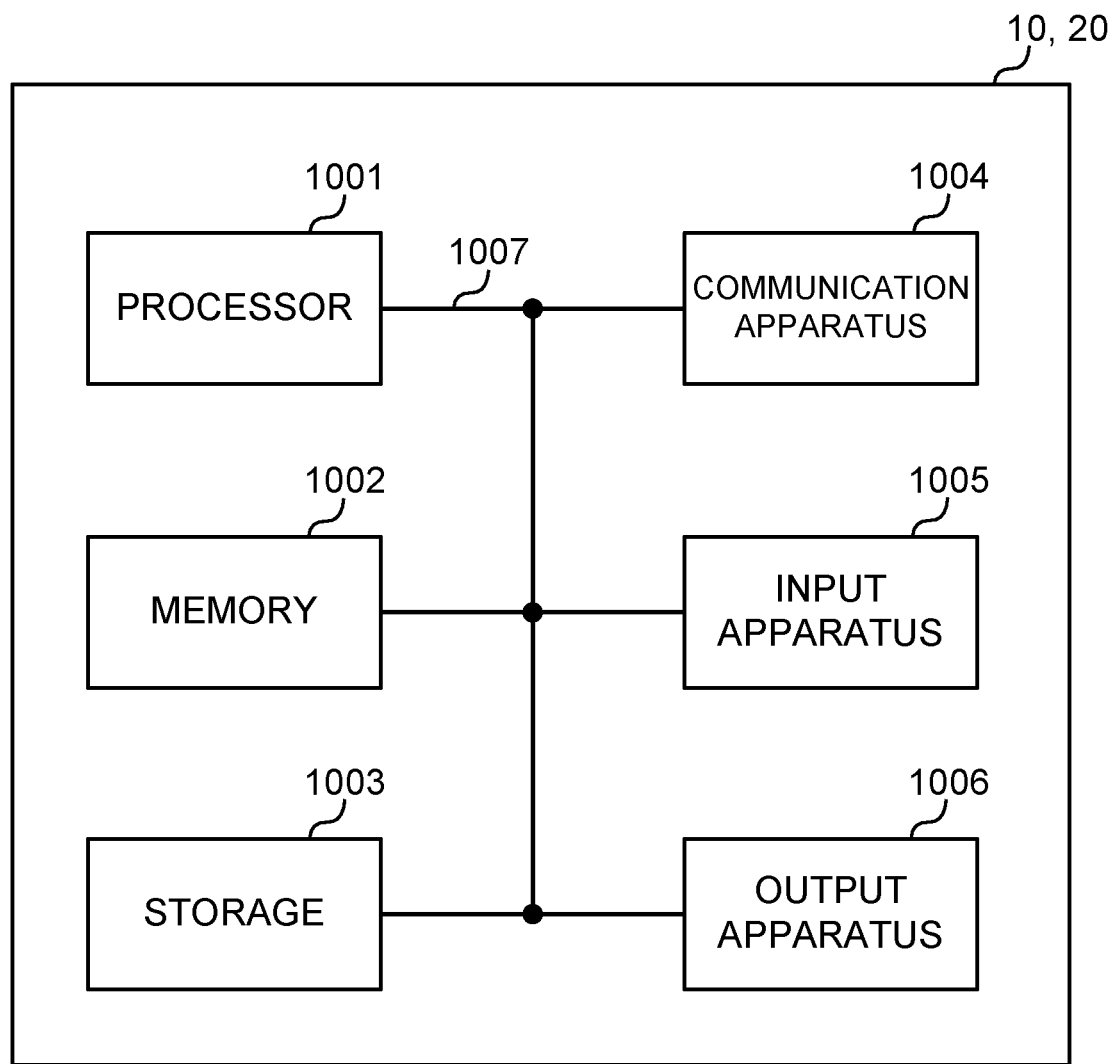
FIG. 23 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 23 is a diagram to show an example of a hardware structure of the base station and the user terminal according to one embodiment.

Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, media access control control elements (MAC control elements (CEs)).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "reference signal (RS) port group," a "layer," "the number of layers," a "rank," a "resource," a "resource set," a "resource group," a "beam," a "beam width," a "beam angular degree," an "antenna," an "antenna element," a "panel," a "transmission/reception point," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives, for each of multiple transmission and reception points, a beam failure detection reference signal (BFD-RS) set including one or more BFD-RSs, the BFD-RS set corresponding to each of the multiple transmission and reception points;
   a processor that, when a radio link quality of all the BFD-RSs included in the BFD-RS set configured for each of the multiple transmission and reception points is less than a threshold, controls a beam failure recovery procedure in a unit of the BFD-RS set; and
   a transmitter that reports UE capability information indicating that multiple BFD-RS sets are supported in beam failure detection,
   wherein when the beam failure recovery procedure is triggered for each of the multiple transmission and reception points and when the beam failure recovery procedure is not completed for any of the multiple transmission and reception points, the processor initiates a random access procedure on a certain cell.

2. The terminal according to claim 1, wherein when the radio link quality of all the BFD-RSs included in the BFD-RS set configured for each of the multiple transmission and reception points is less than a threshold, the processor notifies information regarding a candidate BFD-RS set corresponding to one transmission and reception point.

3. The terminal according to claim 1, wherein at least one of a counter counted based on notification of information regarding beam failure detection and a timer started based on the notification of the information regarding the beam failure detection is configured for each transmission and reception point.

4. The terminal according to claim 1, wherein the processor notifies beam failure recovery, using a scheduling request configured for each transmission and reception point.

5. The terminal according to claim 1, further comprising:
   a transmitter that, when beam failure recovery is triggered for a transmission and reception point in which beam failure is detected, transmits a medium access control control element (MAC CE) for beam failure recovery,
   wherein when information regarding the transmission and reception point in which beam failure is detected is included in the MAC CE for the beam failure recovery, the processor cancels the beam failure recovery triggered.

6. A radio communication method for a terminal, comprising:
   receiving, for each of multiple transmission and reception points, a beam failure detection reference signal (BFD-RS) set including one or more BFD-RSs, the BFD-RS set corresponding to each of the multiple transmission and reception points;
   when a radio link quality of all the BFD-RSs included in the BFD-RS set configured for each of the multiple transmission and reception points is less than a threshold, controlling a beam failure recovery procedure in a unit of the BFD-RS set;
   reporting UE capability information indicating that multiple BFD-RS sets are supported in beam failure detection; and
   when the beam failure recovery procedure is triggered for each of the multiple transmission and reception points and when the beam failure recovery procedure is not completed for any of the multiple transmission and reception points, initiating a random access procedure on a certain cell.

7. A base station comprising:
   a transmitter that transmits, to a terminal, for each of multiple transmission and reception points, a beam failure detection reference signal (BFD-RS) set including one or more BFD-RSs, the BFD-RS set corresponding to each of the multiple transmission and reception points;
   a processor that, when a radio link quality of all the BFD-RSs included in the BFD-RS set configured for each of the multiple transmission and reception points is less than a threshold in a terminal, controls a beam failure recovery procedure in a unit of the BFD-RS set; and
   a receiver that receives UE capability information indicating that multiple BFD-RS sets are supported in beam failure detection,
   wherein when the beam failure recovery procedure is triggered for each of the multiple transmission and reception points and when the beam failure recovery procedure is not completed for any of the multiple transmission and reception points, the terminal initiates a random access procedure on a certain cell.

8. A system comprising a terminal and a base station, wherein
   the terminal comprises:
   a receiver that receives, for each of multiple transmission and reception points, a beam failure detection reference signal (BFD-RS) set including one or more BFD-RSs, the BFD-RS set corresponding to each of the multiple transmission and reception points;
   a processor that, when a radio link quality of all the BFD-RSs included in the BFD-RS set configured for each of the multiple transmission and reception points is less than a threshold, controls a beam failure recovery procedure in a unit of the BFD-RS set; and a transmitter that reports UE capability information indicating that multiple BFD-RS sets are supported in beam failure detection, wherein when the beam failure recovery procedure is triggered for each of the multiple transmission and reception points and when the beam failure recovery procedure is not completed for any of the multiple transmission and reception points, the processor initiates a random access procedure on a certain cell, and the base station comprises:

a transmitter that transmits the BFD-RS set.

* * * * *